United States Patent
Kumar et al.

(10) Patent No.: US 10,727,973 B1
(45) Date of Patent: Jul. 28, 2020

(54) APPARATUS AND METHOD FOR SELF-LEARNING AND PREDICTIVE DWDM NETWORK

(71) Applicant: Fujitsu Limited, Kawasaki-shi, Kanagawa (JP)

(72) Inventors: Arvind Kumar, Haryana (IN); Niranjan Mahabaleshwar, Plano, TX (US); Mritunjay Pandey, Karnataka (IN); Shyam Ramachandran, Karnataka (IN)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 16/389,562

(22) Filed: Apr. 19, 2019

(51) Int. Cl.
| | |
|---|---|
| H04B 10/077 | (2013.01) |
| H04J 14/02 | (2006.01) |
| H04L 12/751 | (2013.01) |
| H04J 14/04 | (2006.01) |
| H04L 12/715 | (2013.01) |
| H04L 12/721 | (2013.01) |

(52) U.S. Cl.
CPC ...... *H04J 14/0271* (2013.01); *H04B 10/0773* (2013.01); *H04B 10/0775* (2013.01); *H04J 14/0227* (2013.01); *H04J 14/04* (2013.01); *H04L 45/08* (2013.01); *H04L 45/123* (2013.01); *H04L 45/64* (2013.01); *H04L 45/70* (2013.01)

(58) Field of Classification Search
None
See application file for complete search history.

(56) References Cited

U.S. PATENT DOCUMENTS

| | | | | |
|---|---|---|---|---|
| 9,461,923 | B2 * | 10/2016 | Li | H04L 47/2441 |
| 2015/0163152 | A1 * | 6/2015 | Li | H04L 47/2441 370/409 |
| 2016/0191194 | A1 * | 6/2016 | Wood | H04J 14/0286 398/58 |
| 2018/0205454 | A1 * | 7/2018 | Shiner | H04B 10/0795 |
| 2018/0220210 | A1 * | 8/2018 | Paraschis | H04Q 11/0066 |
| 2018/0359029 | A1 * | 12/2018 | Shiner | H04J 14/0221 |
| 2018/0367214 | A1 * | 12/2018 | Woodward | H04Q 11/00 |
| 2019/0261071 | A1 * | 8/2019 | Rafique | G06N 3/04 |

* cited by examiner

*Primary Examiner* — Li Liu
(74) *Attorney, Agent, or Firm* — Baker Botts L.L.P.

(57) ABSTRACT

Systems and methods for self-characterization of a software-defined optical network are disclosed. A test transponder may generate and transmit test traffic using various combinations of transmission parameters to discern physical characteristic of a route between two network elements. The test transponder may compute optical characteristics of the route based on the physical characteristics and transmission parameters. An SDN controller may maintain a characterization database storing test results. The test results may be fed to a machine learning engine, which outputs predictions or recommendations regarding utilization of bandwidth and other resources. The optical network may be adapted to handle requested, observed, or predicted changes in on-demand traffic or traffic surges. The test results may be used to defragment the optical spectrum with minimal or no impact on existing traffic to make space in a flexible grid for newly launched channels or channels being moved to different spectrum locations.

20 Claims, 13 Drawing Sheets

APPARATUS AND METHOD FOR SELF-LEARNING AND PREDICTIVE DWDM NETWORK

BACKGROUND

Field of the Disclosure

The present disclosure relates generally to optical communication networks and, more particularly, to systems and methods for self-characterization and prediction in a software-defined optical network.

Description of the Related Art

Telecommunication, cable television and data communication systems use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM). Optical networks may also include various optical elements, such as amplifiers, dispersion compensators, multiplexer/demultiplexer filters, wavelength selective switches (WSS), optical switches, couplers, etc. to perform various operations within the network.

Software-defined networking (SDN) represents an important step towards network virtualization and abstraction and may allow for a logical network entity to be instantiated automatically using software instructions, rather than manually from user input. In this manner, SDN may enable flexible definition of virtual networks. For example, SDN may enable a traffic flow entity to be instantiated using an arbitrary combination of layer identifiers defined in a header space, such as using various combinations of traffic identifiers (Internet-protocol (IP) addresses, media access controller (MAC) addresses, port addresses, etc.) at various layers to define a traffic flow. Then, by installing and configuring packet-forwarding rules associated with the traffic flow to physical switches, an SDN controller may ensure that the traffic flow entity instantiates a path that is routed through a network including the physical switches.

SUMMARY

In one aspect, a method for self-characterization of a software-defined optical network is disclosed. The method includes selecting, by a software-defined networking (SDN) controller for the optical network, a first network element on a first route in the optical network as a source network element, the first route representing a first available channel in the optical network, and selecting, by the SDN controller, a second network element neighboring the first network element on the first route as a destination network element. The method also includes, for each of a plurality of collections of transmission parameters for an optical transponder of the first network element, configuring, by the SDN controller, the optical transponder of the first network element to transmit traffic to the second network element over a portion of the first route between the first network element and the second network element in accordance with the collection of transmission parameters, activating, by the SDN controller, testing by the optical transponder of the first network element, transmitting, by the optical transponder of the first network element to the second network element over the portion of the first route in accordance with the collection of transmission parameters, test traffic generated by the optical transponder of the first network element, receiving, by the optical transponder of the first network element from the second network element responsive to the transmission of the test traffic, data indicative of one or more physical characteristics of the portion of the first route, calculating, by the optical transponder of the first network element, one or more optical characteristics associated with the portion of the first route dependent on the collection of transmission parameters and the data indicative of the one or more physical characteristics of the portion of the first route, and storing, by the SDN controller, test results including the data indicative of the one or more physical characteristics of the portion of the first route and the one or more calculated optical characteristics in a characterization database in association with the collection of transmission parameters and an identifier of the portion of the first route.

In any of the disclosed embodiments, the collection of transmission parameters may specify two or more of a data rate, a data type, a modulation format, and a forward error correction mechanism. Selecting the first network element may include determining that the optical transponder of the first network element includes circuitry to calculate the one or more optical characteristics associated with the portion of the first route dependent on the collection of transmission parameters and the data indicative of the one or more physical characteristics of the portion of the first route.

In any of the disclosed embodiments, the one or more physical characteristics may include one or more of a distance between the first network element and the second network element, a fiber core diameter, a gain profile of a fiber, a dispersion profile of a fiber, a scattering profile of a fiber, or an absorption profile of a fiber, and the one or more optical characteristics may include one or more of a spectral efficiency, an asymptotic power efficiency, an average symbol rate, an average energy per bit, a fiber attenuation, a stimulated Brillouin scattering, a stimulated Ramen scattering, and a Rayleigh scattering.

In any of the disclosed embodiments, the method further may further include identifying, by the SDN controller, a second route between the first network element and the second network element. The method may also include, for each of the plurality of collections of transmission parameters for the optical transponder of the first network element, configuring, by the SDN controller, the optical transponder of the first network element to transmit traffic to the second network element over the second route between the first network element and the second network element in accordance with the collection of transmission parameters, activating, by the SDN controller, additional testing by the optical transponder of the first network element, transmitting, by the optical transponder of the first network element to the second network element over the second route in accordance with the collection of transmission parameters, test traffic generated by the optical transponder of the first network element, receiving, by the optical transponder of the first network element from the second network element responsive to the transmission of the test traffic, data indicative of one or more physical characteristics of the second route, calculating, by the optical transponder of the first network element, one or more optical characteristics associated with the second route dependent on the collection of transmission parameters and the data indicative of the one or more physical characteristics of the second route, and storing, by the SDN controller, test results including the data indicative of the one or more physical characteristics of the second route and the one or more calculated optical characteristics associated with the second route in the characterization database in association with the collection of transmission parameters and an identifier of the second route.

In any of the disclosed embodiments, the method further may further include selecting, by the SDN controller, a third network element on a second route in the optical network as a source network element, the second route representing a second available channel in the optical network, and selecting, by the SDN controller, a fourth network element neighboring the third network element on the second route as a destination network element. The method may also include, for each of a plurality of collections of transmission parameters for an optical transponder of the third network element, configuring, by the SDN controller, the optical transponder of the third network element to transmit traffic to the fourth network element over a portion of the second route between the third network element and the fourth network element in accordance with the collection of transmission parameters for the optical transponder of the third network element, activating, by the SDN controller, testing by the optical transponder of the third network element, transmitting, by the optical transponder of the third network element to the fourth network element over the portion of the second route in accordance with the collection of transmission parameters for the optical transponder of the third network element, test traffic generated by the optical transponder of the third network element, receiving, by the optical transponder of the third network element from the fourth network element responsive to the transmission of the test traffic, data indicative of one or more physical characteristics of the second route, calculating, by the optical transponder of the third network element, one or more optical characteristics associated with the second route dependent on the collection of transmission parameters for the optical transponder of the third network element and the data indicative of the one or more physical characteristics of the second route, and storing, by the SDN controller, test results including the data indicative of the one or more physical characteristics of the second route and the one or more calculated optical characteristics associated with the second route in the characterization database in association with the collection of transmission parameters for the optical transponder of the third network element and an identifier of the second route.

In any of the disclosed embodiments, the method further may further include receiving, by the SDN controller on behalf of an application executing on one or more network elements in the optical network, a request to allocate an available channel in the optical network for new traffic or for traffic to be moved from a channel in use in the optical network, identifying, by the SDN controller, a spectrum location of a given available channel in the optical network suitable for satisfying the request dependent on the stored test results, allocating, by the SDN controller, the identified spectrum location of the given available channel for the new traffic or the traffic to be moved, selecting, by the SDN controller for the given available channel, one of the plurality of collections of transmission parameters suitable for satisfying the request dependent on the stored test results, and configuring, by the SDN controller, a transponder of a network element in the optical network to transmit the new traffic or the traffic to be moved over the given available channel in accordance with the selected one of the plurality of collections of transmission parameters.

In any of the disclosed embodiments, the method may further include providing, by the SDN controller, the test results to a machine learning model for analysis and identifying the spectrum location of the given available channel in the optical network suitable for satisfying the request is further dependent on the analysis.

In any of the disclosed embodiments, the method further may further include providing, by the SDN controller, the test results to a machine learning model for analysis, the analysis including predicting future resource needs in the optical network and predicting whether or not the future resource needs can be met by the optical network.

In another aspect, a system for self-characterization of a software-defined optical network is disclosed. The system includes a plurality of network elements in a known grid topology, each including a respective optical transponder, and a software-defined networking (SDN) controller for the optical network, including a memory media and a processor having access to the memory media. The memory media store instructions executable by the processor for selecting a first one of the plurality of network elements on a first route in the optical network as a source network element, the first route representing an available channel in the optical network, for selecting a second one of the plurality of network element neighboring the first network element on the first route as a destination network element and, for each of a plurality of collections of transmission parameters for the optical transponder of the first network element, for configuring the optical transponder of the first network element to transmit traffic to the second network element over a portion of the first route between the first network element and the second network element in accordance with the collection of transmission parameters, for activating testing by the optical transponder of the first network element and for storing test results in a characterization database in association with the collection of transmission parameters and an identifier of the portion of the first route. The optical transponder of the first network element includes first circuitry to transmit, to the second network element over the portion of the first route in accordance with the collection of transmission parameters, test traffic generated by the optical transponder of the first network element, second circuitry to receive, from the second network element, data indicative of one or more physical characteristics of the portion of the first route, third circuitry to calculate one or more optical characteristics associated with the portion of the first route dependent on the collection of transmission parameters and the data indicative of the one or more physical characteristics of the portion of the first route and fourth circuitry to provide the test results, including the data indicative of the one or more physical characteristics of the portion of the first route and the one or more calculated optical characteristics, to the SDN controller.

In any of the disclosed embodiments, the one or more physical characteristics may include one or more of a distance between the first network element and the second network element, a fiber core diameter, a gain profile of a fiber, a dispersion profile of a fiber, a scattering profile of a fiber, or an absorption profile of a fiber, and the one or more optical characteristics may include one or more of a spectral efficiency, an asymptotic power efficiency, an average symbol rate, an average energy per bit, a fiber attenuation, a stimulated Brillouin scattering, a stimulated Ramen scattering, and a Rayleigh scattering.

In any of the disclosed embodiments, the memory media may further store instructions executable by the processor for identifying a second route between the first network element and the second network element and, for each of the plurality of collections of transmission parameters for the optical transponder of the first network element, for configuring the optical transponder of the first network element to transmit traffic to the second network element over the second route between the first network element and the second network element in accordance with the collection of transmission parameters, for activating additional testing by the optical transponder of the first network element, and for storing results of the additional testing in the characterization database in association with the collection of transmission parameters and an identifier of the second route. The optical transponder of the first network element may further include fifth circuitry to transmit, to the second network element over the second route in accordance with the collection of transmission parameters, test traffic generated by the optical transponder of the first network element, sixth circuitry to receive, from the second network element, data indicative of one or more physical characteristics of the second route, seventh circuitry to calculate one or more optical characteristics associated with the second route dependent on the collection of transmission parameters and the data indicative of the one or more physical characteristics of the second route, and eighth circuitry to provide, to the SDN controller, the results of the additional testing, including the data indicative of the one or more physical characteristics of the second route and the one or more calculated optical characteristics associated with the second route.

In any of the disclosed embodiments, the memory media may further store instructions executable by the processor for selecting, by the SDN controller, a third network element on a second route in the optical network as a source network element, the second route representing a second available channel in the optical network, for selecting, by the SDN controller, a fourth network element neighboring the third network element on the second route as a destination network element and, for each of a plurality of collections of transmission parameters for an optical transponder of the third network element, for configuring the optical transponder of the third network element to transmit traffic to the fourth network element over a portion of the second route between the third network element and the fourth network element in accordance with the collection of transmission parameters for the optical transponder of the third network element, for activating additional testing by the optical transponder of the third network element, and for storing results of the additional testing including data indicative of one or more physical characteristics of the second route and one or more calculated optical characteristics associated with the second route in the characterization database in association with the collection of transmission parameters for the optical transponder of the third network element and an identifier of the second route. The optical transponder of the third network element may also include fifth circuitry to transmit, to the fourth network element over the portion of the second route in accordance with the collection of transmission parameters for the optical transponder of the third network element, second test traffic generated by the optical transponder of the third network element, sixth circuitry to receive, from the fourth network element responsive to the transmission of the second test traffic, data indicative of the one or more physical characteristics of the second route, and seventh circuitry to calculate the one or more optical characteristics associated with the second route dependent on the collection of transmission parameters for the optical transponder of the third network element and the data indicative of the one or more physical characteristics of the second route.

In any of the disclosed embodiments, the memory media may further store instructions executable by the processor for receiving, on behalf of an application executing on one or more network elements in the optical network, a request to allocate an available channel in the optical network for new traffic or for traffic to be moved from a channel in use in the optical network, for identifying a spectrum location of a given available channel in the optical network suitable for satisfying the request dependent on the stored test results, for allocating the identified spectrum location of the given available channel for the new traffic or the traffic to be moved, for selecting, for the given available channel, one of the plurality of collections of transmission parameters suitable for satisfying the request dependent on the stored test results, and for configuring a transponder of a network element in the optical network to transmit the new traffic or the traffic to be moved over the given available channel in accordance with the selected one of the plurality of collections of transmission parameters.

In any of the disclosed embodiments, the memory media may further store instructions executable by the processor for providing the test results to a machine learning model for analysis and for identifying the spectrum location of the given available channel in the optical network suitable for satisfying the request is further dependent on the analysis.

In any of the disclosed embodiments, the memory media may further store instructions executable by the processor for providing the test results to a machine learning model for analysis. The analysis may include predicting future resource needs in the optical network and predicting whether or not the future resource needs can be met by the optical network.

In any of the disclosed embodiments, the memory media may further store instructions executable by the processor for creating a linked list of channels in the optical network in which each element in the linked list includes data indicating attributes associated with a respective channel in the optical network, the attributes including one or more of an indication of whether the channel is occupied or available, a grid size, a center frequency, a span length, an indication of whether the channel is associated with an available standby channel, a supported data rate, a supported transmission protocol, a supported modulation format, an indication of whether the channel supports a fixed forward error correction mechanism or an adaptive forward error correction mechanism, a number of hops on the channel, a number of optical add/drop multiplexers, on the channel, and an impact on traffic when moving the channel.

In any of the disclosed embodiments, the first network element may include an active transponder configured to transmit traffic for an active channel at a first central frequency, the active channel switched to a first wavelength selective switch through a first data path switch, a standby transponder configured to transmit traffic for a standby channel at a second central frequency, the standby channel switched to a second wavelength selective switch through a second data path switch, and a test transponder coupled to the first data path switch and the second data path switch through a third data path switch. The first, second, and third data path switches may be switchable to block the standby channel at the second data path switch and connect the test transponder to the second wavelength selective switch through the second data path switch.

In yet another aspect, an optical transponder of a first network element in a software-defined optical network is disclosed. The optical transponder includes, first circuitry to receive, from a software-defined networking (SDN) controller, control information for configuring the optical transponder to transmit traffic to a second network element over a first route between the first network element and the second network element in accordance with a specified collection of transmission parameters of the optical transponder, second circuitry to generate test traffic to be transmitted by the optical transmitter, third circuitry to transmit, to the second network element over the first route in accordance with the specified collection of transmission parameters, the generated test traffic, fourth circuitry to receive, from the second network element, data indicative of one or more physical characteristics of the first route, fifth circuitry to calculate one or more optical characteristics associated with the first route dependent on the specified collection of transmission parameters and the data indicative of the one or more physical characteristics of the first route, and sixth circuitry to provide, to the SDN controller, first test results including the data indicative of the one or more physical characteristics of the first route and the one or more calculated optical characteristics associated with the first route.

In any of the disclosed embodiments, the one or more physical characteristics may include one or more of a distance between the first network element and the second network element, a fiber core diameter, a gain profile of a fiber, a dispersion profile of a fiber, a scattering profile of a fiber, or an absorption profile of a fiber, and the one or more optical characteristics may include one or more of a spectral efficiency, an asymptotic power efficiency, an average symbol rate, an average energy per bit, a fiber attenuation, a stimulated Brillouin scattering, a stimulated Ramen scattering, and a Rayleigh scattering.

In any of the disclosed embodiments, the optical transponder may further include seventh circuitry to receive, from the SDN controller, control information for configuring the optical transponder to transmit traffic to the second network element over a second route between the first network element and the second network element in accordance with a specified collection of transmission parameters of the optical transponder, eighth circuitry to transmit, to the second network element over the second route in accordance with the collection of transmission parameters, second test traffic generated by the optical transponder of the first network element, ninth circuitry to receive, from the second network element responsive to the transmission of the second test traffic, data indicative of one or more physical characteristics of the second route, tenth circuitry to calculate one or more optical characteristics associated with the second route dependent on the collection of transmission parameters and the data indicative of the one or more physical characteristics of the second route, and eleventh circuitry to provide, to the SDN controller, second test results including the data indicative of the one or more physical characteristics of the second route and the one or more calculated optical characteristics associated with the second route.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
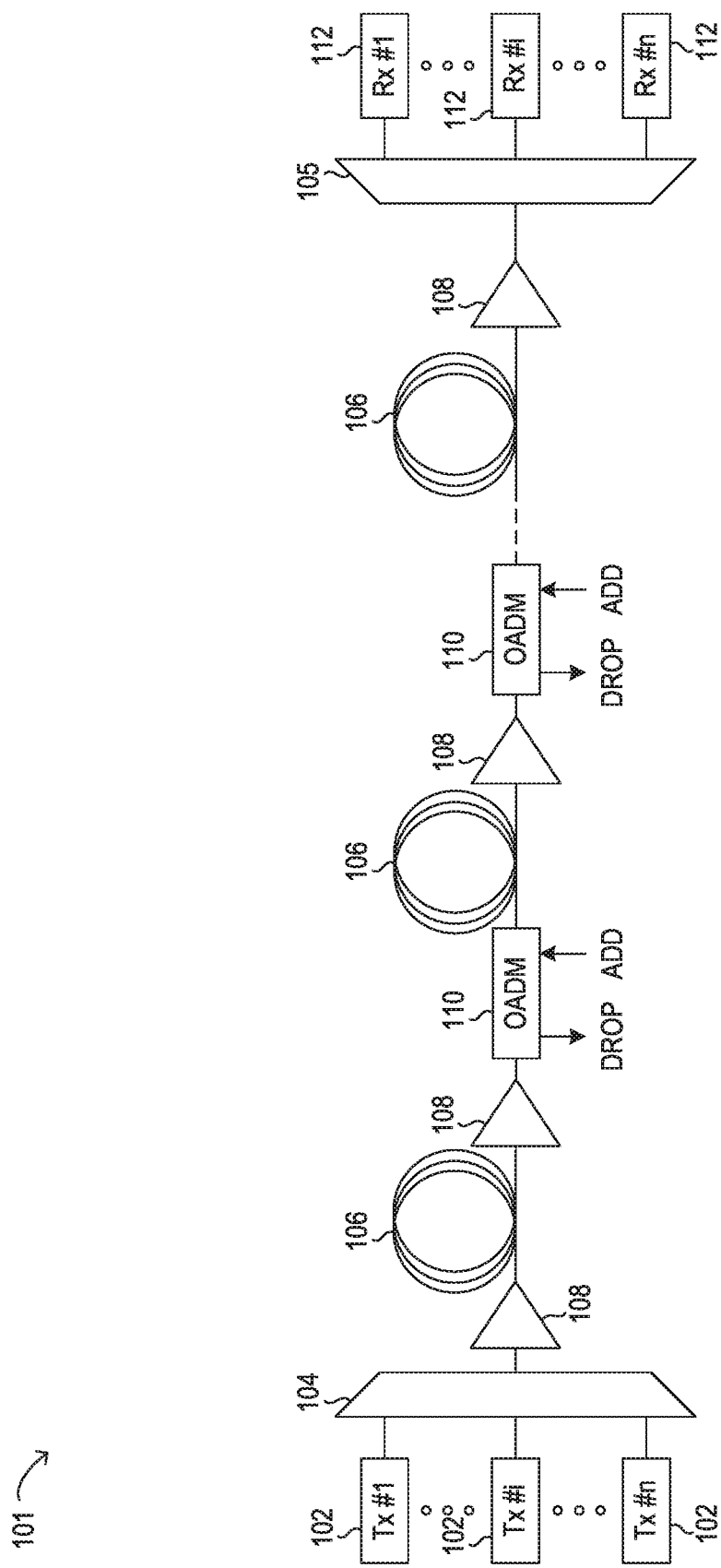
FIG. 1 is a block diagram of selected elements of an embodiment of an optical network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

The efficient use of network resources is always a concern of network operators, who face strong pressure to reduce the per unit bandwidth cost as well as network power consumption. However, network utilization efficiency in some existing wavelength-routed optical networks may be limited when there is a mismatch of granularities between the client layer, which may support a broad range of capacity demands with granularities of several gigabits per second to 100 Gb/s or more, and the physical wavelength layer. For example, when the end-to-end client traffic is not sufficient to fill the entire capacity of a wavelength, residual bandwidth of that wavelength is wasted. This is sometimes referred to as the "stranded bandwidth" issue. Even in a flexible grid, the optical spectrum may become fragmented following the allocation of multiple channels. In addition, changing optical characteristics of a network may hinder the ability to launch new channels or may impact existing channels. For example, the resource usage and/or performance of an optical network may be impacted by the addition of more high capacity channels causing refractive index changes due to the Kerr effect and the introduction of additional nonlinear effects, polarization mode dispersion caused due to fiber twists, amplified spontaneous emission noise changes due to increased amplification needs, or changes in laser characteristics over a period of time.

As described in more detail here, in some embodiments, a system for optical transmission may include test transponders which, during testing, may obtain and compute various physical and optical characteristics of different routes between network elements in a software-defined optical network. These test results may be stored in a characterization database for subsequent analysis by, or on behalf of, various applications. This learning may help address problems encountered in some existing systems when launching new channels and when moving channels in a fragmented flexible grid, including issues related to defragmentation. The test results may be provided to an SDN controller configured to determine whether future demands of the optical network can be met by the optical network as currently configured, and to recommend changes, if not.

The SDN controller may include a machine learning engine into which the test results are fed as training data and which outputs a prediction or recommendation made on behalf of an application executing in the optical network. For example, the machine learning engine output may specify, among other possibilities, a suitable location for a new channel, a collection of transmission parameters suitable for a new channel, a respective identifier for each of one or more channels to be moved to make space for a new channel, a respective identifier for each of one or more channels to be moved as part of a defragmentation operation or to meet predicted future resource needs, a time or duration for a next maintenance window or a recommendation to perform a defragmentation operation, a prediction of future resource needs or whether the optical network can meet predicted future resource needs, a predicted cost of taking a particular action, or another prediction or recommendation for an action to be taken in the optical network in accordance with the objective function of the machine learning engine.

Referring now to the drawings, FIG. 1 illustrates an example embodiment of optical network 101, which may represent an optical communication system. Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a Single-Mode Fiber (SMF), Enhanced Large Effective Area Fiber (E-LEAF), or TrueWave® Reduced Slope (TW-RS) fiber.

To increase the information capacity and transport capabilities of optical network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical network 101. In some embodiments, optical transmitter 102 may be used to determine the baud rate for the data to be transmitted during the optical modulation. An example of transmitter 102 for applying different baud rates is an adaptive rate transponder. Additionally, a forward error correction module may be included in optical transmitter 102, or may be used in conjunction with optical transmitter 102. The FEC module may process the electrical signal carrying the information or data to be transmitted to include error correction codes. The FEC module at transmitter 102 may also determine a baud rate for sending the data to be transmitted to optical transmitter 102 for optical modulation.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of an optical pump to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device to add and drop optical signals (for example at individual wavelengths) from fibers 106. After passing through an OADM 110, an optical signal may travel along fibers 106 directly to a destination, or the signal may be passed through one or more additional OADMs 110 and optical amplifiers 108 before reaching a destination. In this manner, OADMs 110 may enable connection of different optical transport network topologies together, such as different rings and different linear spans. In one example, the distance between a transmitter and a destination receiver might be 1000 kilometers, and an optical signal traveling along fibers 106 from the transmitter to the receiver might pass through 100 or more ROADM devices before reaching its destination.

In certain embodiments of optical network 101, each OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) that may be included in a ROADM.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADMs) and with conventional implementations of demultiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WSS).

As shown in FIG. 1, optical network 101 may include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels. It will be understood that different numbers of channels or subcarriers may be transmitted and demultiplexed in optical transport network 101, in various embodiments.

In FIG. 1, optical network 101 may include receivers 112 coupled to demultiplexer 105. Each receiver 112 may receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network. As shown, receivers 112 may demodulate the optical signals according to a baud rate used by transmitter 102. In some embodiments, receiver 112 may include, or may be followed by, a forward error correction (FEC) module to use the error correction codes to check the integrity of the received data. The FEC module may also correct certain errors in the data based on the error correction codes. The FEC module at receiver 112 may also demodulate the data at a specific baud rate defined for each channel at transmitter 102, as described above.

As noted above, optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Examples of PSK and QAM with a different number of symbols can include binary PSK (BPSK or 2-PSK) using two phases at 0° and 180° (or in radians, 0 and π) on the constellation diagram; or quadrature PSK (QPSK, 4-PSK, or 4-QAM) using four phases at 0°, 90°, 180°, and 270° (or in radians, 0, π/2, π, and 3π/2). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, m-QAM signals may be polarized using techniques such as dual-polarization 16-QAM (DP-16-QAM), wherein separate m-QAM signals are multiplexed by orthogonally polarizing the signals.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, and a hierarchical network topology. In operation of optical transport network 101, each of transmitters 102 and receivers 112 may be enabled to implement two or more modulation formats.

The amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information can be transmitted over an optical network may be the bit rate of transmission. The higher the bit rate, the greater the transmitted information capacity. Achieving higher bit rates may be limited by the availability of wide bandwidth electrical driver technology, digital signal processor technology and increase in the required OSNR for transmission over optical network 101.

A traditional ROADM network typically implements fixed grids with grid bandwidth at 50 GHz and 100 GHz boundaries, as defined by the ITU standard. When using these fixed channels, bandwidth can be wasted if the traffic using one of these channels does not require as much as 50 GHz or 100 GHz spacing. For example a 40 Gb/s channel for traffic being transmitted using QPSK might not need a 100 GHz channel when transmitting the data over a short distance. In this example, a single channel at 70 GHz spacing might be sufficient. In some embodiments of the present disclosure, coherent select technology may be used to tune a flexible grid for a wider range of wavelengths from the C-band, with the flexibility to use any size grid in the available spectral bandwidth. With coherent select technology, all the wavelengths may be sent in all directions without using active WSS devices that work on a fixed ITU standard grid. Instead, passive devices may be used. In coherent select technology, it is the responsibility of receiver to select the desired wavelength. Achieving this functionality may require a strong layer zero control plan controlling the wavelengths at transmitters and receivers over the entire network span. In some example embodiments, in order to optimize the use of available spectral bandwidth, the entire C-band may be divided into multiple channels of 6.25 GHz granularity, which is the minimum sized slice of the spectral bandwidth, in this example. Subsequently, depending upon the exact need, the number of these channels to be allocated to traffic between two peers in the optical network may be selected in a manner that avoids wasting bandwidth. By choosing the number of channels in a grid for a particular type of channel with a specific modulation format, a particular distance (or reach) can be achieved with a particular FEC mechanism (e.g., with a particular number of FEC overhead bytes or no overhead bytes). In some embodiments, there is direct relationship between the number of channels used in a flexible grid and the extra overhead bytes used for forward error correction.

In some embodiments of the present disclosure, higher modulation formats may be used to compress the information for a specific data rate channel and use fewer channels in a grid. For example, for the same data rate 16-QAM carries approximately twice the number of bits per symbol than does QPSK, therefore requiring half the symbol rate and, consequently, half the spectral bandwidth. Similarly, 64-QAM carries three times the number of bits per symbol than does QPSK, and requires one third the spectral bandwidth. Thus, spectral bandwidth can be saved by reducing the symbol rate and increasing the number of bits per symbol to transmit the same data rate. In some cases, however, when using higher order (or maximum order) modulation formats and no FEC overhead bytes, a receiver might not receive all of the transmitted symbols. For example, since higher-level bit loading decreases the distance between the two closest constellation points, 16-QAM and 64-QAM formats suffer from signal-to-noise penalties per bit of 4 dB and 8.5 dB, respectively, when compared with QPSK. In some embodiments, by using a combination of modulation formats supported on the transponder along with an adaptive FEC mechanism, an optimal number of channels may be selected from the grid for a specific span length.

Figure 2:
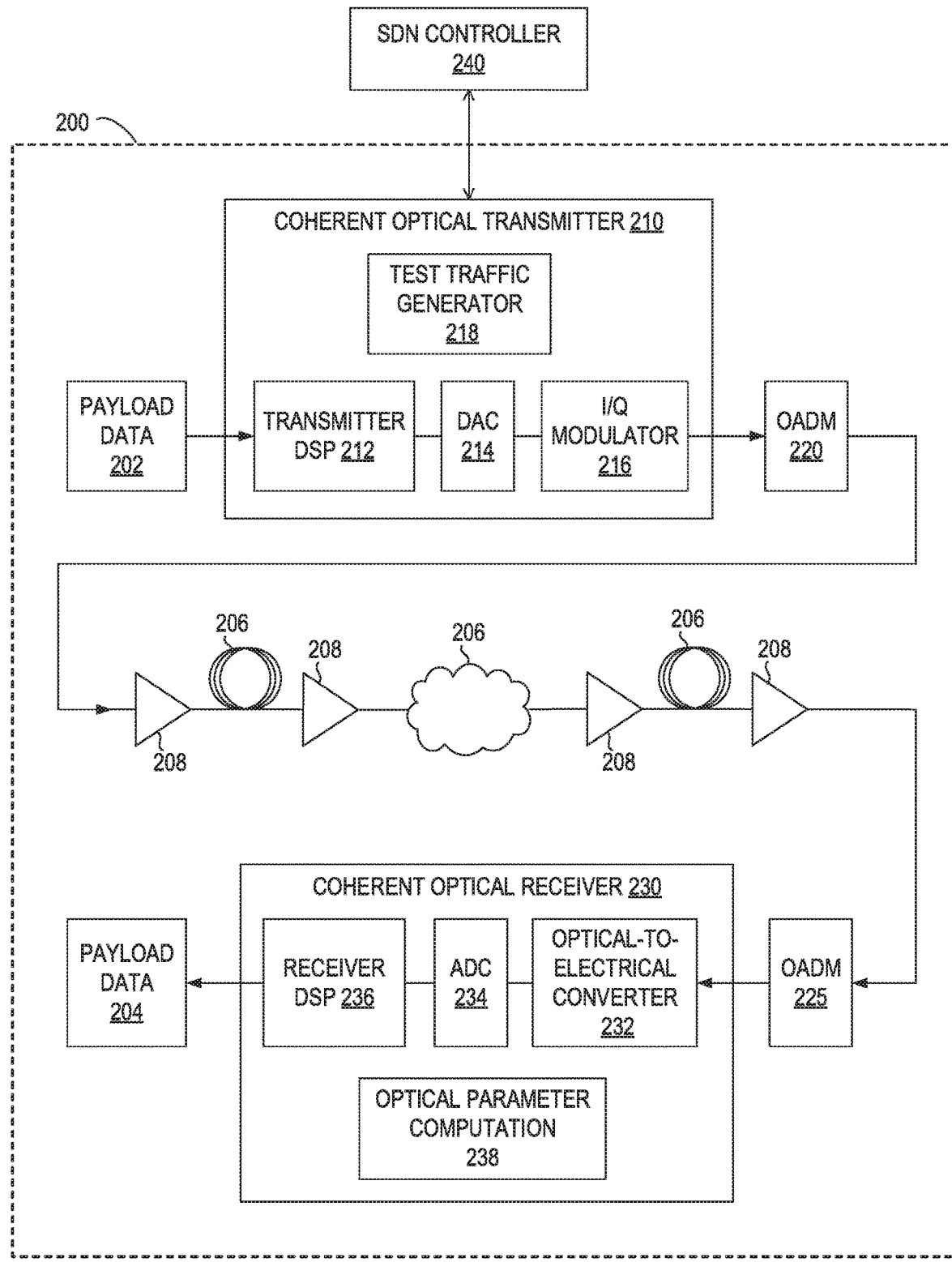
FIG. 2 is a block diagram of selected elements of an embodiment of an optical network.

FIG. 2 is a block diagram of selected elements of an example embodiment of an optical network 200. In this example embodiment, optical network 200 is a software-defined network (SDN) for optical transport. Optical network 200 may include, or be communicatively coupled to, SDN controller 240, which may communicate with each of the devices and/or other elements of optical network 200. In some embodiments, SDN controller 240 may be similar to SDN controller 700 illustrated in FIG. 7 or SDN controller 1300 illustrated in FIG. 13 and described below. For example, SDN controller may include a software controller 1320 configured to provide configuration and control information to one or more of the devices and/or other elements of optical network 200 to allow a logical network entity to be instantiated automatically using software instructions, rather than manually based on user input, thus enabling the flexible definition of virtual networks.

In the example embodiment illustrated in FIG. 2, optical network 200 includes two optical transponders that communicate with each other over fibers 206 (which may be similar to fibers 106 illustrated in FIG. 1 and described above). A first one of the transponders is shown as coherent optical transmitter 210 and a second one of the transponders is shown as coherent optical receiver 230. However, each of these transponders may include all of the elements and functionality of both a coherent optical transmitter and a coherent optical receiver. In this example, payload data 202 is provided to coherent optical transmitter 210 for processing and transmission as an optical signal over fibers 206, and coherent optical receiver 230 receives an optical signal over fibers 206 and processes it to reconstruct transmitted payload data 202 as received payload data 204.

Coherent optical transmitter 210 includes, among other elements, transmitter digital signal processor (DSP) 212, digital-to-analog converter (DAC) 214, and quadrature (I/Q) modulator 216 that collectively convert payload data 202 into an optical signal for transmission over fibers 206. Coherent optical receiver 230 includes, among other elements, receiver DSP 236, analog-to-digital converter (ADC) 234, and optical-to-electrical converter 232 that collectively convert a received optical signal into payload data 204.

In embodiments in which a test transponder in a network element includes a coherent optical transmitter 210 and a coherent optical receiver 230, the coherent optical transmitter 210 also includes a test traffic generator 218, as shown in FIG. 2. The test traffic generator 218 is configured to generate test traffic to be transmitted during a testing operation in which the test transponder gathers physical characteristics of routes between a pair of network elements and computes optical characteristics of the routes based on the physical characteristics and the transmission parameters of the test transponder. In such embodiments, the coherent optical receiver 230 of the test transponder also includes an optical parameter computation element 238 for computing the optical characteristics, as shown in FIG. 2. The physical and optical characteristics obtained and computed by the test transponder are described in more detail below.

Optical network 200 also includes OADMs 220 and 225, which may be similar to OADMs 110 illustrated in FIG. 1 and described above, and multiple optical amplifiers 208, which may be similar to optical amplifiers 108 illustrated in FIG. 1 and described above. As described in more detail below, SDN controller 240 may include an adaptive flexible grid controller 930 for configuring a flexible grid in optical network 200, including selecting a minimum number of channels to allocate to traffic between two peers in the network (e.g., between coherent optical transmitter 210 and coherent optical receiver 230) based on a tuning of the modulation format for the traffic and a tuning of the number of forward error correction overhead bytes included in packets transmitted between the two peers. In some embodiments, SDN controller may be similar to SDN controller 700 illustrated in FIG. 7 or SDN controller 1300 illustrated in FIG. 13 and described below.

In certain embodiments, pairs of peers in an optical network (e.g., a pair of optical transponders such as coherent optical transmitter 210 and coherent optical receiver 230) may be configured to communicate control information to each other according to a predetermined handshake protocol. In one example in which FEC overhead bytes are enabled for correcting errors, the control information may be communicated in accordance with the handshake protocol using control overhead bytes (e.g., general communication channel bytes, such as GCC0 bytes) included in one or more packets exchanged between the optical transponders. In another example, the control information may be communicated in accordance with the handshake protocol using another type of out-of-band channel for communicating control information in the optical network, such as an optical supervisory channel (OSC). In certain embodiments, the handshake protocol may be used to return performance feedback from a receiving optical transponder (e.g., coherent optical receiver 230) to a transmitting optical transponder (e.g., coherent optical transmitter 210). In certain embodiments, the handshake protocol may be used by a transmitting optical transponder (e.g., coherent optical transmitter 210) to communicate clock synchronization information due to the inclusion of extra FEC overhead bytes to a receiving optical transponder (e.g., coherent optical receiver 230). For example, the inclusion of extra FEC overhead bytes changes the data rate for the traffic between the two optical transponders.

In certain embodiments, the number of FEC overhead bytes supported in the optical networks described herein can vary from 0 bytes (in which case forward error correction is disabled) up to a maximum number of FEC overhead bytes that is equal to the number of data bytes in packets transmitted by the optical transponders. As described in more detail below, the optical transponders may be capable of adjusting the number of FEC overhead bytes based on a feedback mechanism between communicating pairs of optical transponders. For example, if the traffic between two optical transponders is communicated in 256-byte blocks of data, the optical transponder may be enabled to add up to 256 FEC overhead bytes to each packet. Similarly, if the traffic between two optical transponders is communicated in 1024-byte blocks of data, the optical transponder may be enables to add up to 1024 FEC overhead bytes to each packet, and so on. In certain embodiments, a proprietary frame format may be used to communicate the additional overhead bytes (e.g., FEC overhead bytes and/or GCC bytes), since anything over 16 additional FEC overhead bytes falls outside the standard optical frame formats. For example, according to the optical transport protocols typically used in DWDM communication, FEC overhead bytes are included in the defined optical frame format such that for every 239 bytes of payload data there are 16 bytes used as FEC overhead bytes.

In at least some embodiments, each of the optical transponders (such as coherent optical transmitter 210 and coherent optical receiver 230) may be enabled to implement two or more modulation formats. For example, each of the transponders may support two or more adaptive modulation formats including, but not limited to, FSK, ASK, BPSK, QPSK, 8-QAM, 16-QAM, 32-QAM, among others. In certain embodiments, an optical transponder may support up to 128 different modulation formats or more.

In certain embodiments, the techniques described herein may be used to implement systems and methods for self-characterization of a software-defined optical network. Each of these systems may include one or more test transponders, an adaptive flexible grid, and an SDN controller. In some embodiments, these systems may include support for standby channels, such as a Y-cable-based switching mechanism. The methods described herein may include data generation and gathering through testing, machine learning and prediction based on test results, using test results and results of machine learning for managing on-demand traffic, and defragmentation applications, each of which is described in more detail below.

Figure 3:
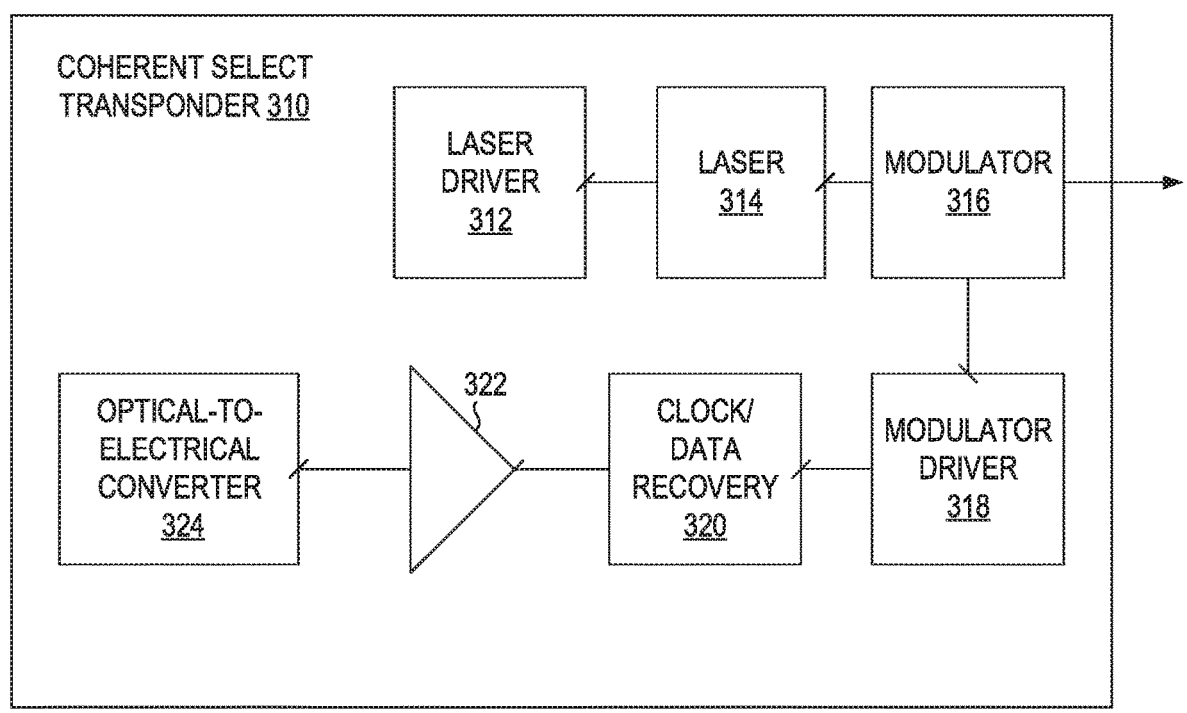
FIG. 3 is a block diagram of selected elements of an embodiment of a coherent select transponder.

FIG. 3 is a block diagram of selected elements of an example embodiment of a coherent select transponder 310. In this example embodiment, coherent select transponder 310 includes laser driver 312, laser 314, modulator 316, modulator driver 318, clock/data recovery 320, optical amplifier 322, and optical-to-electrical converter 324. In particular embodiments, each of the transponders in optical network 101 illustrated in FIG. 1 and/or in optical network 200 illustrated in FIG. 2 may include elements similar to those of coherent select transponder 310 illustrated in FIG. 3. For example, some or all of the elements of coherent select transponder 310 illustrated in FIG. 3 may be included in any of transmitters 102 and/or receivers 112 illustrated in FIG. 1, or in coherent optical transmitter 210 and/or coherent optical receiver 230 illustrated in FIG. 2. In certain embodiments, some or all of the elements of coherent select transponder 310 illustrated in FIG. 3 may be included in a test transponder, such as those described herein.

In at least some embodiments, the test transponders described herein may include or support flexible modulation formats, an adaptive forward error correction mechanism, a coherent receiver, a flexible data rate, and a flexible data type. The test transponders may be able to tune to both C-band and L-band channels. In some embodiments, they may also be able to tune to S-band channels. The techniques described herein for self-characterizing and predictive optical networks may be in fixed grid networks and in flexible grid networks, in different embodiments.

In at least some embodiments, the test transponders described herein may, at different times, be configured to operate using different collections of transmission parameters. For example, a test transponder may be configured by an SDN controller to operate using any one of multiple collections of transmission parameters, each of which includes a specified data rate, a specified data type, a specified modulation format, and a specified FEC mechanism. The test transponders may support data rates from 2.5 gigabit-per-second (Gbps) to 1000 Gbps or higher, in some embodiments. The test transponders may support multiple modulation formats including, but not limited to, FSK, ASK, BPSK, QPSK, and m-QAM type formats, among others. In certain embodiments, the test transponders may support up to 128 different modulation formats or more. The test transponders may support multiple FEC mechanisms including, but not limited to, standard FEC, enhanced FEC, and adaptive FEC with a configurable number of overhead bytes between 0 and half the number of bytes in the payload, for example. The test transponders may also support multiple transmission technologies and corresponding data types including, but not limited to, Ethernet, Gigabit Ethernet, Optical Transport Network (OTN), Fibre Channel, Synchronous Optic Network (SONET), Synchronous Digital Hierarchy (SDH), OTUCn, FlexEthernet, and Modular Light Grid (e.g., MLG2.0).

In some embodiments of the present disclosure that use ROADM technologies, DWDM grids may be implemented at a minimum grid spacing of 6.25 GHz. By dividing the spectral bandwidth into these minimum sized slices of 6.25 GHz, the optical networks described herein may provide more flexibility in choosing spectrum bandwidth based upon traffic bandwidth and distance travelled than is possible in networks in which the minimum sized slices are larger than 6.25 GHz (e.g., 7.5 GHz, 12.5 GHz, 50 GHz, or 100 GHz). However, the techniques described herein are applicable in embodiments that implement a different minimum grid spacing (e.g., implementations with a minimum grid spacing that is larger or smaller than 6.25 Ghz). In certain embodiments, grid selection may be a function of the modulation format used, the span length, any non-linear impairments in the fiber and the FEC algorithm used (e.g., the number of FEC overhead bytes added).

In some existing optical networks that implement flexible grids, channels might be added in order to increase reach. However, in certain embodiments of the present disclosure, it might not be necessary to add channels (or to add as many channels) in order to increase reach due to a tuning of the modulation format and/or the FEC mechanism. In one example, for a span of X km length with a first modulation format, and using 10 Gb/s bandwidth, the number of 6.25 GHz slices selected for the traffic may be N. In this example, for a span of Y km length (where Y>X) for the same 10 Gb/s channel the number of 6.25 GHz slices selected for the traffic may M (where M>N). However, it may be possible to use the same number of slices (N) for the Y km span length if the number of FEC overhead bytes is increased. In certain embodiments, the number of FEC overhead bytes B and modulation formats F may be varied for a given span length L exhibiting a specific non-linear effect. In one example, for a given span length, the modulation format may be changed from QPSK, in which case ten channels are selected, to 64-QAM, in which case the number of channels may be reduced to six. In this example, the number of slices may be further reduced by increasing the number of FEC overhead bytes. However, when the number of FEC overhead bytes increases, the data rate at the transmitting optical transponder would change.

Figure 4:
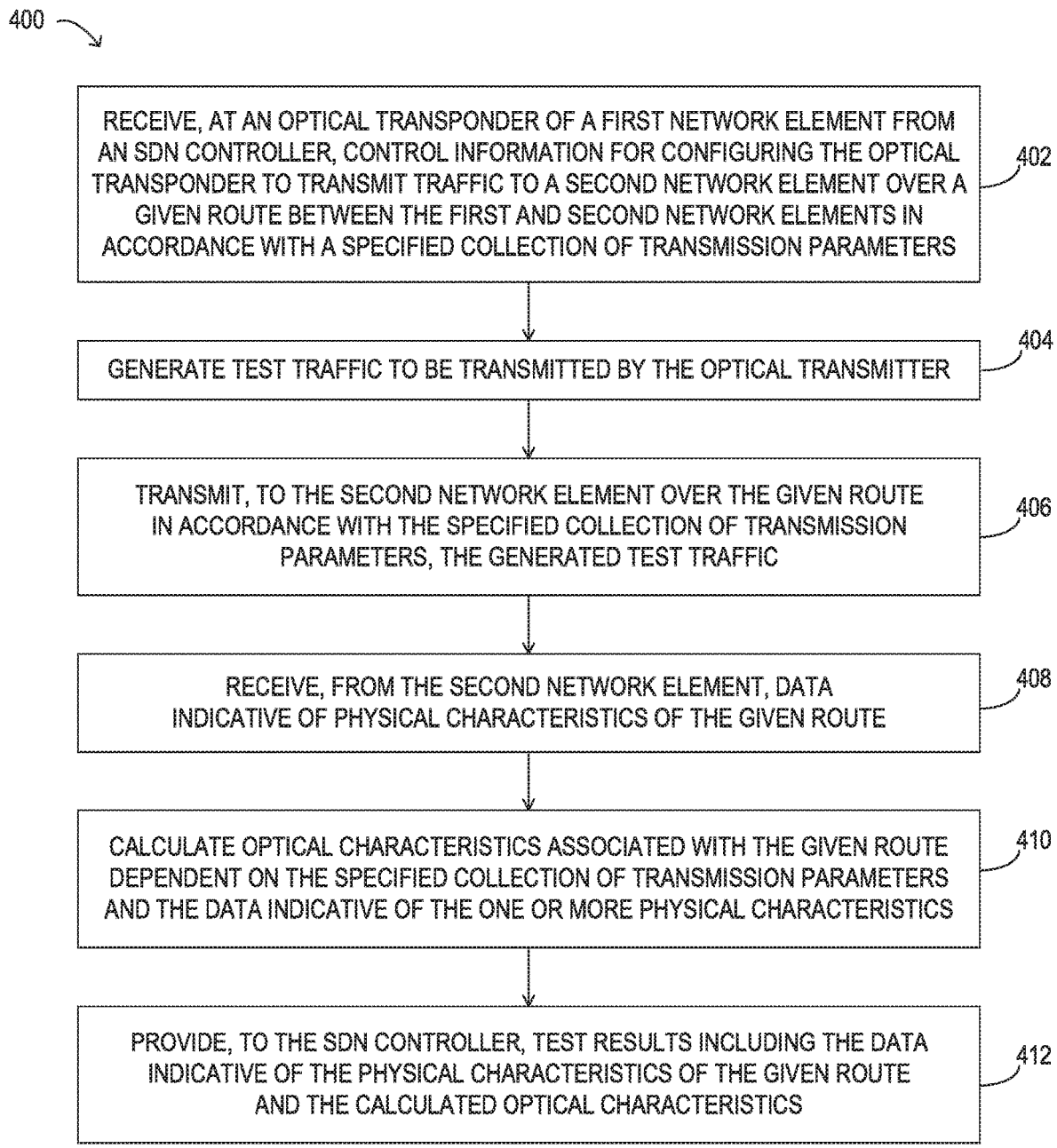
FIG. 4 is a flowchart of selected elements of an embodiment of a method for self-characterization in a software-defined optical network.

Referring now to FIG. 4, a block diagram of selected elements of an embodiment of method 400 for self-characterization of a software-defined optical network is depicted in flowchart form. At least certain operations in method 400 may be performed by an optical transponder in response to configuration of the optical transponder for testing, and activation of the testing, by an SDN controller, such as SDN controller 240 illustrated in FIG. 2, SDN controller 700 illustrated in FIG. 7, or SDN controller 1300 illustrated in FIG. 13. In some embodiments, the software-defined optical network may be implemented on a fixed grid. In other embodiments, the software-defined optical network may be implemented on an adaptive flexible grid. It is noted that certain operations of method 400 illustrated in FIG. 4 may be optional or may be performed in a different order, in different embodiments.

Method 400 may begin at step 402 where an optical transponder of a first network element from an SDN controller receives control information for configuring the optical transponder to transmit traffic to a second network element over a given route between the first and second network elements in accordance with a specified collection of transmission parameters. In some embodiments, the control information may include an identifier or enumeration of the collection of transmission parameters and/or a test activation command. The specified collection of transmission parameters may include a data rate, a data type, a modulation format, and/or a forward error correction mechanism, which may determine the number of FEC overhead bytes.

At step 404, method 400 includes the optical transmitter generating test traffic to be transmitted by the optical transmitter. At step 406, the method includes transmitting, to the second network element over the given route in accordance with the specified collection of transmission parameters, the generated test traffic.

At step 408, method 400 includes receiving, from the second network element, data indicative of one or more physical characteristics of the given route. For example, in various embodiments, the received data may indicate one or more of a distance between the first network element and the second network element, a fiber core diameter, a gain profile of a fiber, a dispersion profile of a fiber, a scattering profile of a fiber, or an absorption profile of a fiber.

At step 410, the method includes calculating one or more optical characteristics associated with the given route dependent on the specified collection of transmission parameters and the data indicative of the one or more physical characteristics. For example, in various embodiments, one or more of the following optical characteristics, among others, may be computed based upon different combinations of transmission parameters and physical characteristics:

Spectral efficiency for all combinations of modulation formats with bandwidth: $SE=\text{Log}_2(M) \div (N/2)$, where M represents the number of symbols and N represents dimensionality.

Asymptotic power efficiency:
$APE=\text{gamma}=d_{min}^2/4E_b=d_{min}^2 \log_2(M)/4E_s$ Average symbol rate (energy per symbol):

$$E_S = \frac{1}{M}\sum_{k=1}^{M} \|c_k\|^2$$

Average energy per bit: $AE_b=E_S/\log_2 M$

Fiber attenuation:

$$\alpha_{db} * L = 10\log_{10}\frac{P_i}{P_0},$$

where $\alpha_{db}$ represents signal attenuation per unit length in decibels, L represents fiber length, $P_i$ represents launch power, and $P_o$ represents received power.

Power loss due to Brillouin scattering: $P_B=4.4\times 10^{-3} d^2\lambda^2\alpha_{db}v$ watts Power loss due to Rayleigh scattering: $P_R=5.9\times 10^{-2}d^2\lambda^2\alpha_{db}$ watts In the two power loss equations above, d represents a fiber core diameter, λ represents an operating wavelength measured in micrometers, $\alpha_{db}$ represents signal attenuation per kilometer in decibels, and v represents the bandwidth of an injection laser.

At step 412, method 400 includes providing, to the SDN controller, test results including the data indicative of the physical characteristics of the given route and the calculated optical characteristics. In some embodiments, the SDN controller may store the test results in a characterization database for the optical network. In some embodiments, the SDN controller may provide the test results to a machine learning model as training data.

In some embodiments, for an adaptive flexible DWDM grid, the allowed frequency slots may have a nominal central frequency (in THz) defined by: 193.1+n×0.00625, where n is a positive or negative integer including 0, and 0.00625 is the nominal central frequency granularity in THz. In this example, the slot width may be defined by: 12.5×m where m is a positive integer and 12.5 is the slot width granularity in GHz. In some embodiments, any combination of frequency slots is allowed as long as no two frequency slots overlap.

Figure 5:
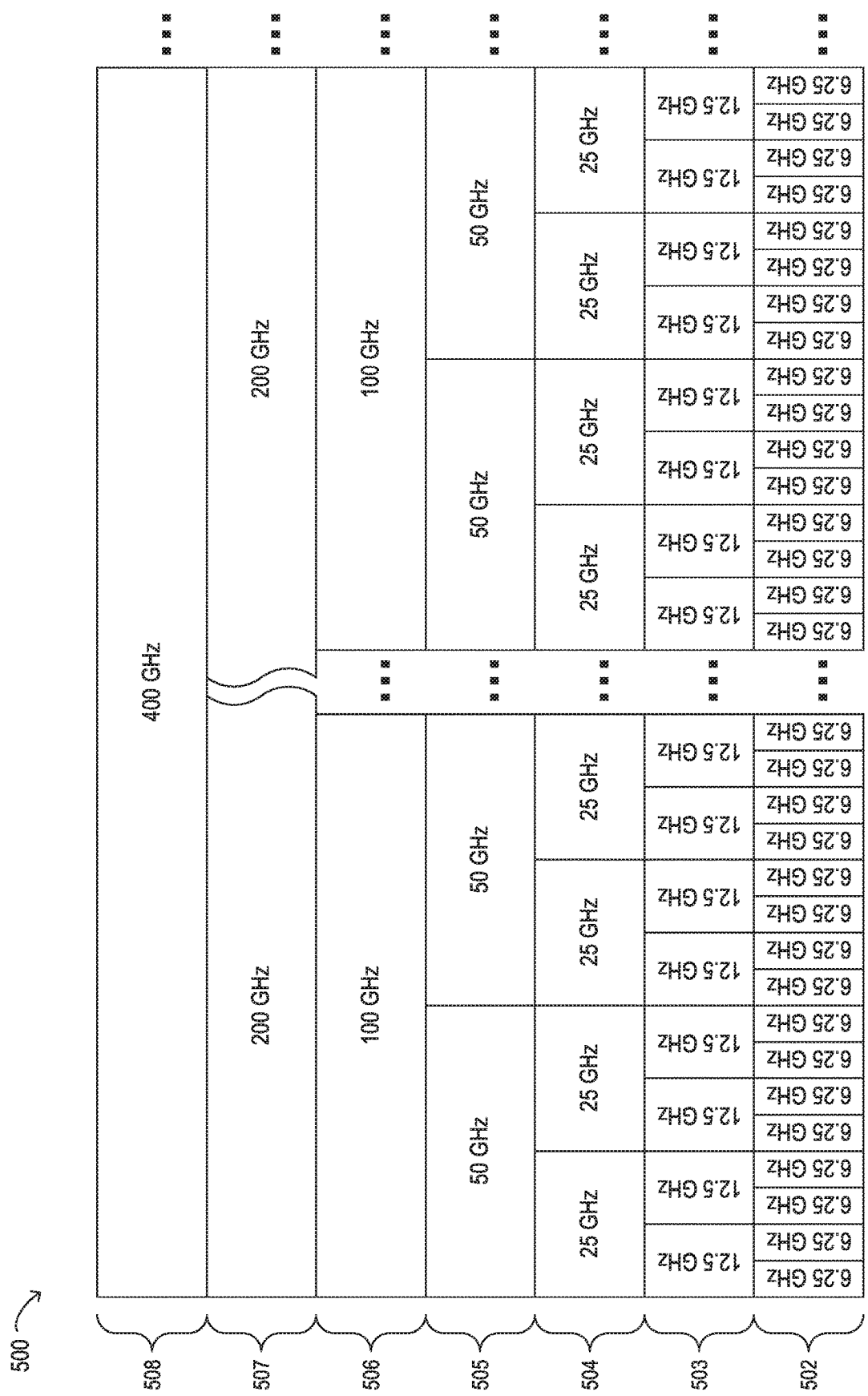
FIG. 5 illustrates a graphical representation of the division of the available spectral bandwidth in an optical network into slices of different sizes in a flexible grid, according to one embodiment.

FIG. 5 is a graphical representation 500 of the division of the available spectral bandwidth in an optical network into slices of different sizes in a flexible grid, according to one embodiment. In this example embodiment, which is simplified for clarity, the total available spectral bandwidth is 400 GHz, and is shown as a single channel in row 508.

Graphical representation 500 depicts multiple rows of flexible grid slices of increasing size. For example, the smallest available slices in the flexible grid, shown in row 502, have a spacing of 6.25 GHz. Therefore, there could be up to a maximum of 64 channels, each comprising a minimum sized slice of the spectral bandwidth, available to be allocated to traffic between two peers in the optical network. In practice, the total available spectral bandwidth of an optical network may be divided into many more channels, each comprising a minimum sized (e.g., 6.25 GHz) slice of the spectral bandwidth. In one example, the total available spectral bandwidth of an optical network operating in the C-band may be divided into 720 channels, each including a respective 6.25 GHz slice of the spectral bandwidth. It should be noted that the techniques described herein may also be used in optical networks operating in other wavelength bands (e.g., the O-band, E-band, S-band, or L-band). The number of channels into which the total available spectral bandwidth is divided may be dependent on both the minimum sized slice supported in the system and the wavelength band in which the optical network is operating. For example, in an embodiment in which the optical network is operating in the L-band, the number of channels into which the total available spectral bandwidth is divided may be much larger than the number of channels into which the total available spectral bandwidth is divided when operating in the C-band, assuming the same minimum sized slice.

Other options for dividing the spectral bandwidth into respective channels include, for example, dividing the spectral bandwidth into 32 channels each comprising a 12.5 GHz slice (shown in row 504), dividing the spectral bandwidth into 16 channels each comprising a 25 GHz slice (shown in row 506), dividing the spectral bandwidth into 8 channels each comprising a 50 GHz slice (shown in row 505), dividing the spectral bandwidth into 4 channels each comprising a 100 GHz slice (show in row 506), or dividing the spectral bandwidth into 2 channels each comprising a 200 GHz slice (shown in row 507). In some embodiments, channels of two or more different sizes may be allocated to the traffic between different pairs of peers in the optical network.

Figure 6:
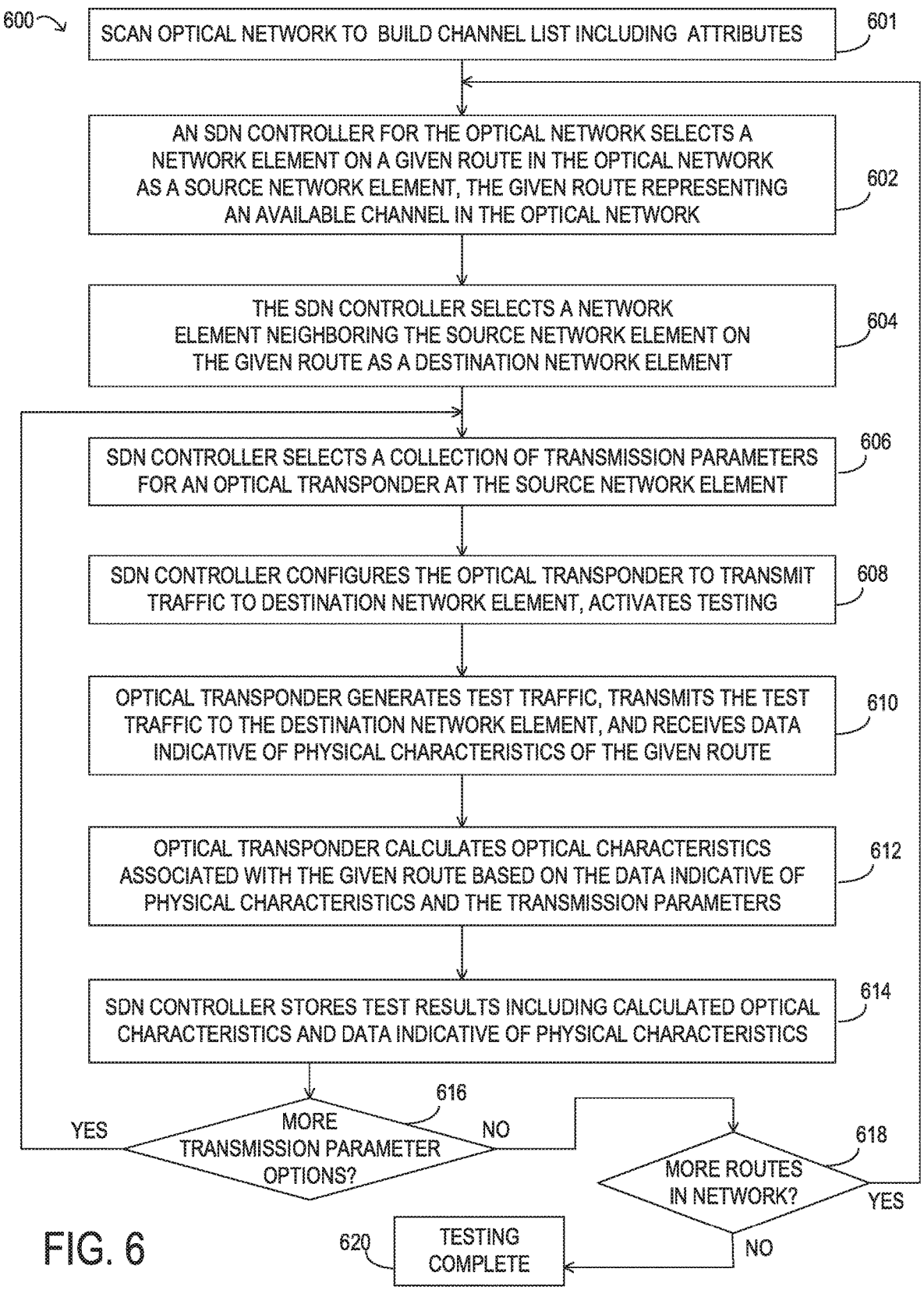
FIG. 6 is a flowchart of selected elements of an embodiment of a method for self-characterization of multiple routes in a software-defined optical network.

Referring now to FIG. 6, a block diagram of selected elements of an embodiment of method 600 for self-characterization of multiple routes in a software-defined optical network, as described herein, is depicted in flowchart form. At least certain operations in method 600 may be performed using an SDN controller, such as SDN controller 240 illustrated in FIG. 2, SDN controller 700 illustrated in FIG. 7, or SDN controller 1300 illustrated in FIG. 13, in conjunction with respective optical transponders of various network elements in the optical network, such as coherent optical transmitter 210 and/or coherent optical receiver 230. In some embodiments, the software-defined optical network may be implemented on a fixed grid. In other embodiments, the software-defined optical network may be implemented on an adaptive flexible grid. It is noted that certain operations of method 600 illustrated in FIG. 6 may be optional or may be performed in a different order, in different embodiments.

Method 600 may begin at step 601, where an optical network is scanned to build a channel list including respective attributes of each identified channel. In some embodiments, the channel lists may be built by topology manager in conjunction and/or a path computation engine of an SDN controller for the optical network. In at least some embodiments, the channel list may include a linked list of all possible channels in the optical network. In some embodiments, the channel list may include a doubly linked list of channels in use. In some embodiments, the channel list may include a doubly linked list of channels that are unused or otherwise available. In various embodiments, the attributes may include one or more of an indication of whether the channel is occupied or available, a grid size, a center frequency, a span length, an indication of whether the channel is associated with an available standby channel, a supported data rate, a supported transmission protocol, a supported modulation format, an indication of whether the channel supports a fixed forward error correction mechanism or an adaptive forward error correction mechanism, a number of hops on the channel, a number of optical add/drop multiplexers, on the channel, and an impact on traffic when moving the channel.

At step 602, the method includes an SDN controller for the optical network selecting a network element on a given route in the optical network as a source network element, the given route representing an available channel in the optical network. At step 604, method 600 includes the SDN controller selecting a network element neighboring the source network element on the given route as a destination network element. In some embodiments, selecting the source and destination network elements may include determining that the optical transponders at the source and destination network elements support the functionality of a test transponder, such as those described herein. For example, selecting the source network element may include determining that the optical transponder at the source network element includes circuitry to obtain, during testing, physical characteristics of a portion of the given route between the source network element and the destination network element, and circuitry to calculate one or more optical characteristics associated with the portion of the given route dependent on a particular collection of transmission parameters with which the optical transponder is configured and the obtained physical characteristics.

At step 606, the method includes the SDN controller selecting one of multiple possible collections of transmission parameters for an optical transponder at the source network element. For example, while the optical transponder at the source network element may support a large number of transmission parameter combinations, not all combinations may be usable together in the context of the optical network, given its topology and underlying hardware elements.

At step 608, method 600 includes the SDN controller configuring the optical transponder at the source network element to transmit traffic to the destination network element, after which the SDN controller activates testing by the optical transponder.

At step 610, the method includes the optical transponder at the source network element generating test traffic, transmitting the test traffic over the given route, in accordance with the selected collection of transmission parameters, to the destination network element, and receiving data indicative of physical characteristics of the given route.

At step 612, method 600 includes the optical transponder at the source network element calculating optical characteristics associated with the given route based on the data indicative of physical characteristics and the selected collection of transmission parameters.

At step 614, the method includes the SDN controller storing test results including the calculated optical characteristics and the data indicative of physical characteristics. For example, the SDN controller may store the test results in a characterization database as training data. In some embodiments, the test results may, at least temporarily, be stored at the optical transponder prior to being provided to, or being made accessible by, the SDN controller.

If, at 616, there are more collections of transmission parameters with which to perform the testing, method 600 returns to step 606, after which steps 606 through 614 are repeated one or more times to apply perform testing on the given route using each additional collection of transmission parameters. As noted above, not all combinations of transmission parameters may be usable together in the context of the optical network, given its topology and underlying hardware elements, and the testing need not include applying combinations of transmission parameters that are not usable together.

If, or once, the testing has been performed for the given route using all available and suitable collections of transmission parameters, method 600 proceeds to step 618. If, at step 618, there are additional routes to which the testing is to be applied, e.g., additional available channels in the optical network, method 600 returns to step 602, after which steps 602 through 618 are repeated one or more times to apply testing to each additional route. Once the testing has been applied to all available routes, method 620 proceeds to step 620, where the testing, and resulting data collection, is complete.

In various embodiments, the operations of method 600 shown in FIG. 6 may be repeated periodically, on demand, in response to particular conditions, such as in response to a request to add or move a channel or in response to the additional or removal of a network element in the optical network, or continuously to update or refine the training data based on additional test results.

In the example embodiment illustrated in FIG. 6 and described above, the data generation and gathering through testing may be applied only to the available channels in the optical network, i.e., channels not currently being used to carry traffic. In such embodiments, other methods may be used to gather training data associated with existing channels and transponders that are carrying traffic. In one example, to test channels in use, GCC bytes (e.g., GCC0/1/2 bytes) may be used to generate test patterns, after which test results, including some or all of the physical and optical characteristics described herein, may be computed based on responses to the test patterns.

Figure 7:
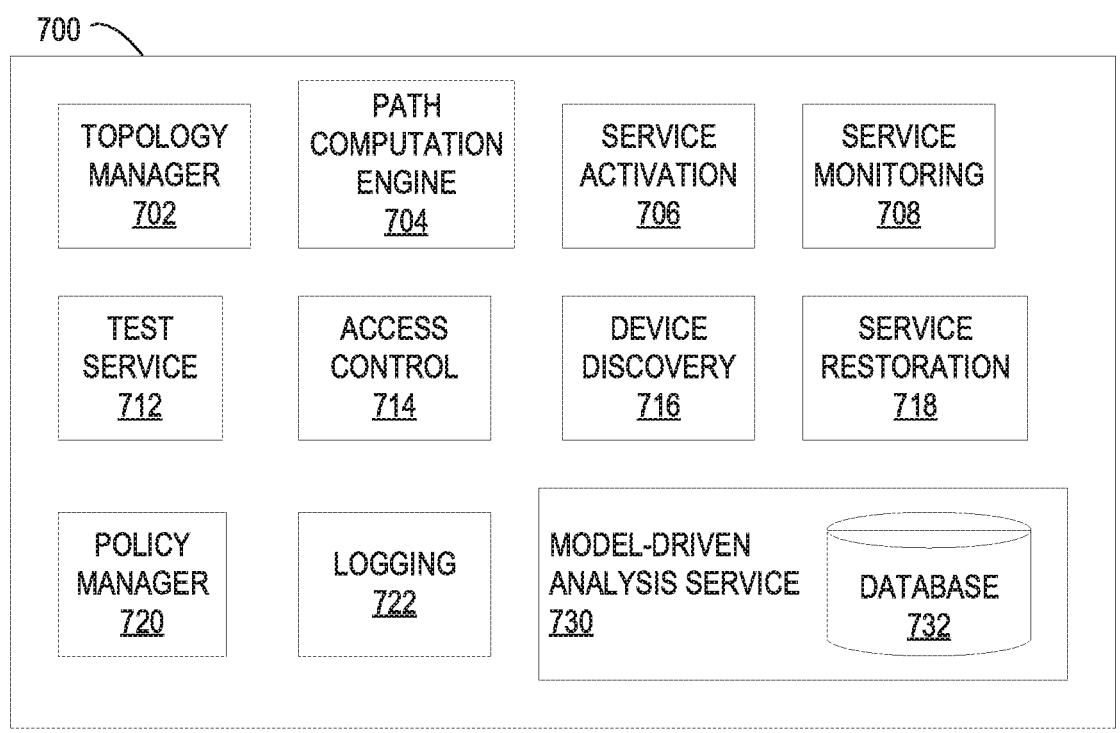
FIG. 7 is a block diagram of selected elements of an embodiment of a modular, multilayer, software-defined networking (SDN) controller.

FIG. 7 is a block diagram of selected elements of an embodiment of a modular, multilayer, software-defined networking (SDN) controller 700. In the illustrated embodiment, SDN controller 700 includes a topology manager 702 configured to scan an optical network to determine the topology of the optical network and gather information about each route, a path computation engine 704 configured to identify suitable routes between pairs of source network elements and destination network elements, a service activation element 706, a service monitoring element 708, an access control element 714 (e.g., a role-based access control element), a device discovery element 716, a service restoration element 718, a policy manager 720, and a logging element 722.

In the illustrated embodiment, SDN controller 700 also includes a test service element 712 configured to initiate testing by a test controller, and a model-driven analysis service 730, which may be configured to analyze test results using machine learning and which includes a database 732 in which test results may be stored for analysis. In some embodiments, model-driven analysis service 730 may include multiple logical functional layers, including device, network, and service layers.

In at least some embodiments, SDN controller 700 may include northbound adaptations, such as application programming interfaces (APIs) and other northbound interfaces (NBIs) to communicate and interact with user applications (e.g., business apps, browsers, or other mobile apps). In at least some embodiments, SDN controller 700 may include southbound adaptations, such as a solid-state drive hosting service, a control protocol for network switches or routers, a transport layer interface, a command-line interface, or other adaptations to facilitate the exchange of configuration information and information indicative of topology, a state change, an alarm, an event, or a database change, among other things. For example, southbound adaptations may facilitate communications with a FLASHWAVE or 1Finity optical communication platform from Fujitsu Network Communications, Inc., a packet-based optical transport platform, or another type of optical transport platform, in various embodiments.

In some embodiments, SDN controller 700 may include more, fewer, or different elements than those depicted in FIG. 7.

Figure 8:
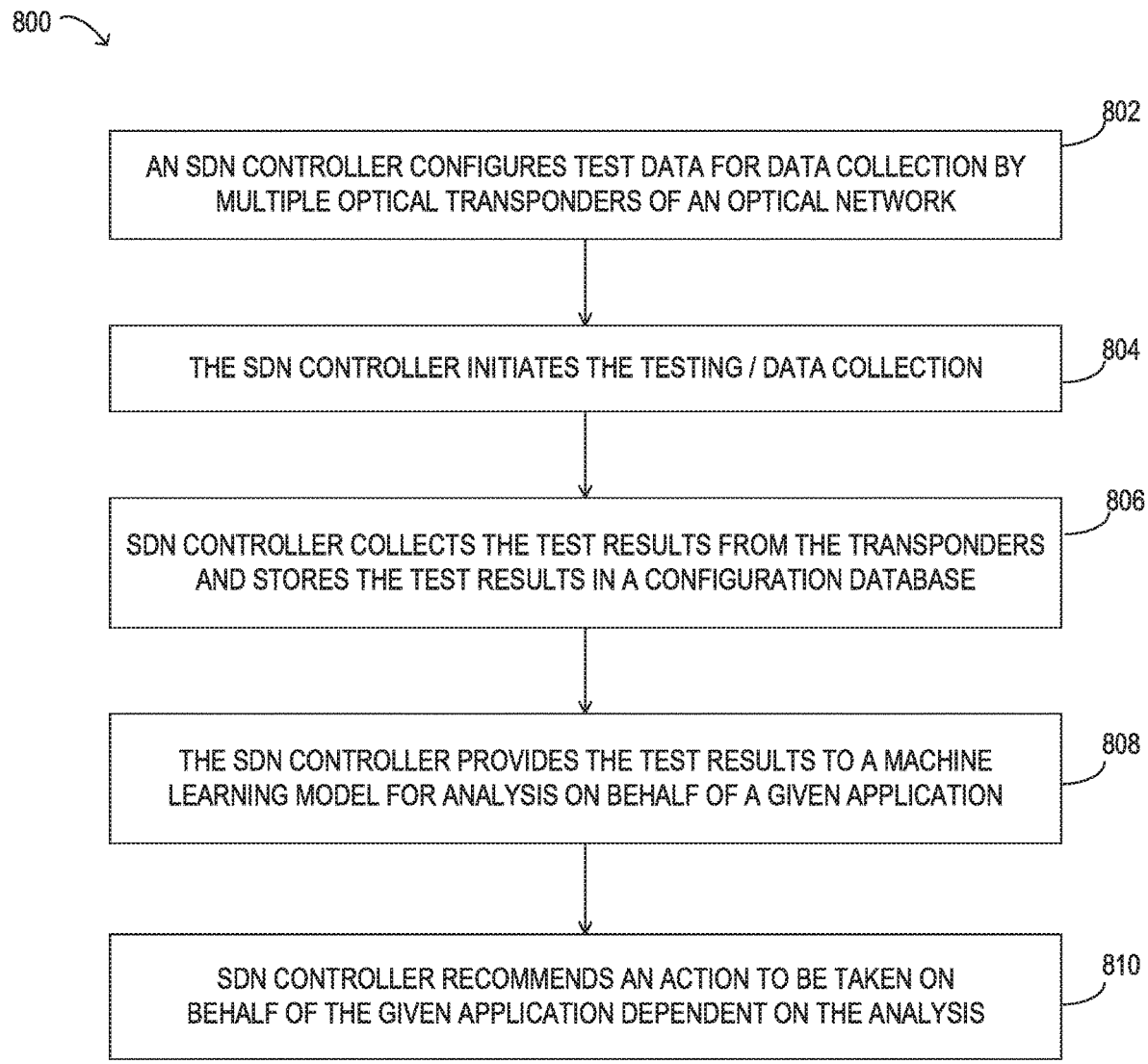
FIG. 8 is a flowchart of selected elements of an embodiment of a method for using machine learning to recommend actions on behalf of an application in a software-defined optical network.

Referring now to FIG. 8, a block diagram of selected elements of an embodiment of method 800 for using machine learning to recommend actions on behalf of an application in a software-defined optical network, as described herein, is depicted in flowchart form. At least certain operations in method 800 may be performed using an SDN controller, such as SDN controller 240 illustrated in FIG. 2, SDN controller 700 illustrated in FIG. 7, or SDN controller 1300 illustrated in FIG. 13, based on test results returned from one or more transponders, such as coherent optical transmitter 210 and/or coherent optical receiver 230. In some embodiments, the software-defined optical network may be implemented on a fixed grid. In other embodiments, the software-defined optical network may be implemented on an adaptive flexible grid. It is noted that certain operations of method 800 illustrated in FIG. 8 may be optional or may be performed in a different order, in different embodiments.

Method 800 may begin at step 802, where an SDN controller configures test data for data collection by multiple optical transponders of an optical network. One example method for performing the data collection is illustrated in FIG. 6 and described above.

At step 804, method 800 includes the SDN controller initiating the testing for data collection.

At step 806, the method includes the SDN controller collecting the test results from the transponders and storing the test results in a configuration database for the optical network.

At step 808, method 800 includes the SDN controller providing the test results to a machine learning model for analysis on behalf of a given application. The objective function for the machine learning model may be dependent on the particular application context. For example, the objective function may be or include throughput performance of the optical network, efficient resource usage, or other measurements of quality or performance in the optical network.

At step 810, the method includes the SDN controller recommending an action to be taken on behalf of the given application dependent on the analysis. In some embodiments, the recommended action may include launching a new channel at specified location, configuring a transponder to use a specified collection of transmission parameters, moving one or more channels to make space for a new channel or as part of a defragmentation operation, adding capacity based on a prediction of future resource needs, or performing a defragmentation operation, among other possible recommended actions.

In at least some embodiments, the data generated by test transponders may be fed into a database associated with a machine learning engine as training data. Using this database, analytics may be performed on continuously learned characteristics of an optical network. For example, using learning from the database, an SDN controller may make decisions about, and take action on, the launching of a fresh channel in the optical network, including finding the best route for the channel in terms of spectral efficiency. In some embodiments, the database may be analyzed to predict future trends in bandwidth and other resource requirements for the optical network. For example, the analysis may be used to recommend, or implement, adapting the optical network to be able to handle peak hour traffic needs (e.g., higher video traffic during non-work hours) or seasonal surges in network traffic, such as during holidays or highly popular sporting events. In another example, the analysis may be used to recommend, or implement, adapting the optical network to be able to handle increased traffic during an unexpected surge, such as in response to a natural disaster or another type of emergency. In yet another example, using learning over a period of time, the SDN controller may, based on an analysis of the database, be able to predict future demand in the network and future growth needs. In some embodiments, the SDN controller may be able to provide billing or costing information associated with a recommended configuration for handling changes in on-demand traffic, based on an analysis of the database.

Figure 9:
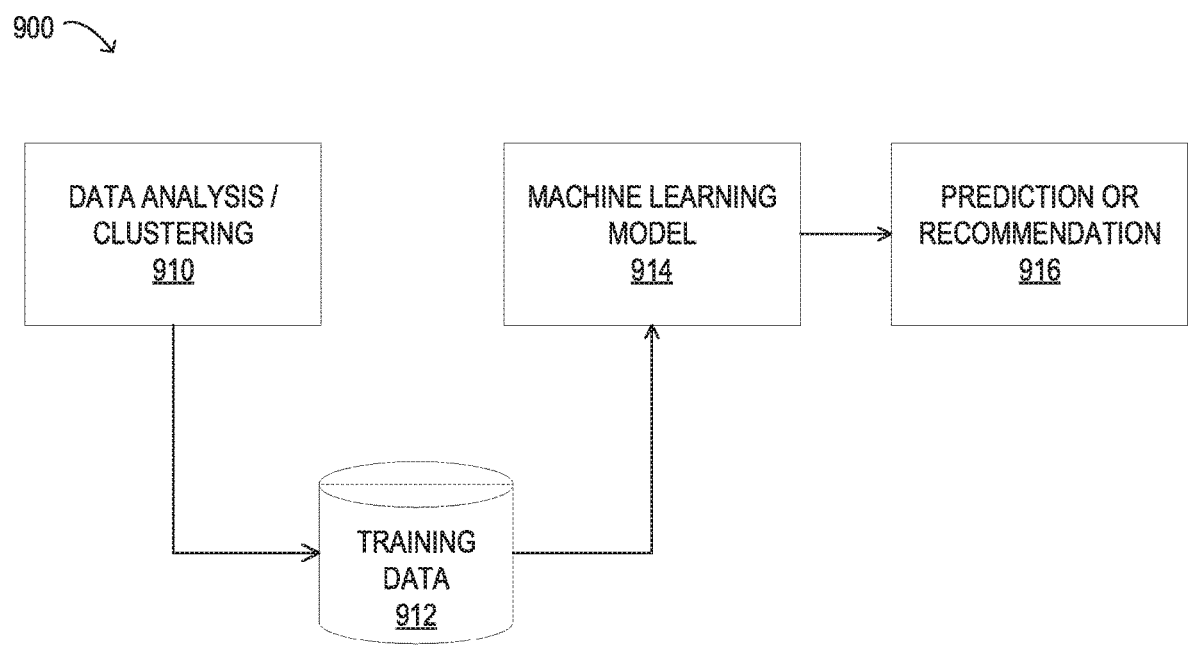
FIG. 9 illustrates a self-learning architecture implemented by an SDN controller, in accordance with some embodiments.

FIG. 9 illustrates a self-learning architecture 900 implemented by an SDN controller in an optical network, in accordance with some embodiments. In the illustrated embodiment, the self-learning model includes a data analysis and clustering process 910 for generating and storing training data 912. For example, the data analysis and clustering process 910 may include initiating test service 712 to configure a test controller for and to activate the testing by the test controller and analyze and store the test results, in a form usable as training data, within a characterization database, as described herein. The training data 912 is provided to machine learning model 914, whose objective function may be dependent on the particular application context. For example, the objective function may be or include throughput performance of the optical network, efficient resource usage, or other measurements of quality or performance in the optical network.

The output of the machine learning model 914 is a prediction or recommendation 916 made on behalf of an application executing in the optical network. For example, the prediction or recommendation 916 may specify a suitable location for a new channel, a collection of transmission parameters suitable for a new channel, a respective identifier for each of one or more channels to be moved to make space for a new channel, a respective identifier for each of one or more channels to be moved as part of a defragmentation operation or to meet predicted future resource needs, a time or duration for a next maintenance window or recommendation to perform a defragmentation operation, a prediction of future resource needs or of whether the optical network can meet predicted future resource needs, a predicted cost of taking a particular action, or another prediction or recommendation for an action to be taken in the optical network in accordance with the objective function.

A variety of factors may affect the optimum allocation of grid slices to particular channels in an optical network. For example, due to differences in non-linearity in the fibers between different network elements and their varying gain profiles, different channels will have varying optical properties and may have different reach. Other factors that may affect the optimum placement of channels include the distance between two transponders, absorption losses, losses due to various types of scattering, various dispersion profiles (e.g., profiles for chromatic dispersion, polarization mode dispersion and/or modal dispersion), and other fiber characteristics. In various embodiments, an SDN controller for an optical network may be able to identify an optimum location in a flexible grid for a new channel between two network elements, based in part on data collected from one or more test transponders, and may launch the new channel at the identified location. For example, when launching a new channel, the SDN controller may automatically determine the number of channels and location of those channels in the flexible grid based upon the distance between the network elements and one or more of the fiber characteristics described herein.

In some embodiments, and at certain times, an SDN controller operated by an optical network service provider may receive a request to move a large amount of data between two network elements. For example, a customer or application may request that data be transferred from one location or datacenter to other location using a web-based application running on mobile phone. The request may specify the source and destination locations along with the total amount of data to be transferred. The SDN controller may read the source and destination addresses and search a characterization database created based on test results obtained by a test transponder for available routes with sufficient bandwidth to satisfy the request. In some embodiments, the SDN controller may publish a list of options, each including an identifier of a route and a total time and cost associated with the route. In such embodiments, the customer may select one of the options, after which the SDN controller may take action in configuring the selected route over which to transfer the data. In other embodiments, the SDN controller may be configured to automatically determine the best route and to configure the best route for transferring the data without customer input.

Figure 10:
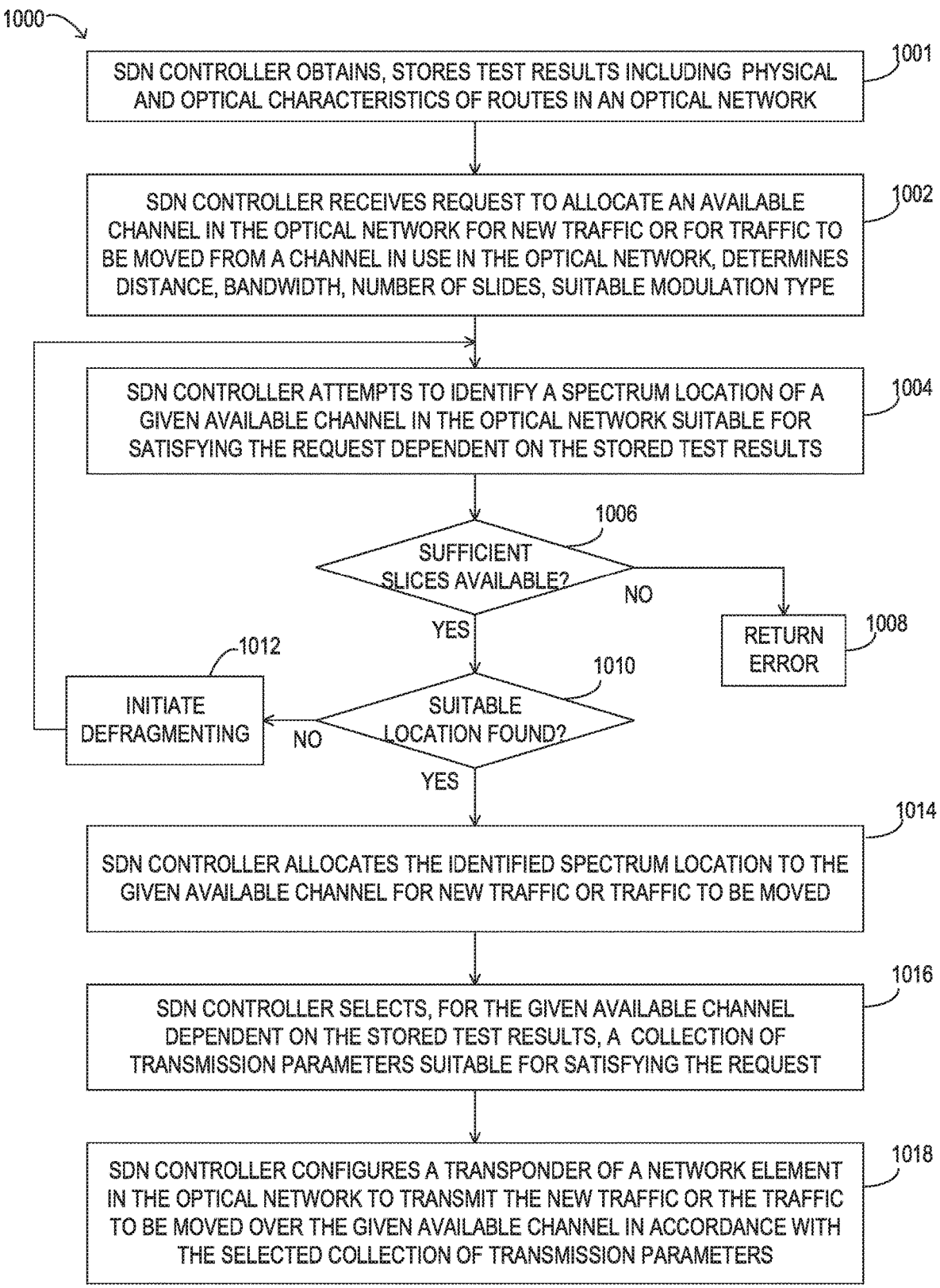
FIG. 10 is a flowchart of selected elements of an embodiment of a method for allocating spectrum for a channel an optical network on behalf of a given application.

Referring now to FIG. 10, a block diagram of selected elements of an embodiment of method 1000 for allocating spectrum for a channel in a software-defined optical network on behalf of a given application, as described herein, is depicted in flowchart form. At least certain operations in method 700 may be performed using an SDN controller, such as SDN controller 240 illustrated in FIG. 2, SDN controller 700 illustrated in FIG. 7, or SDN controller 1300 illustrated in FIG. 13, dependent on physical and optical characteristics received from one or more transponders, such as coherent optical transmitter 210 and/or coherent optical receiver 230. In some embodiments, the software-defined optical network may be implemented on a fixed grid. In other embodiments, the software-defined optical network may be implemented on an adaptive flexible grid. It is noted that certain operations of method 1000 illustrated in FIG. 10 may be optional or may be performed in a different order, in different embodiments.

Method 1000 may begin at step 1001, where an SDN controller obtains and stores test results including physical and optical characteristics of routes in the optical network. As described herein, the test results may be received from various optical transponders in the optical network during testing for data collection. One example method for obtaining and storing such test results is illustrated in FIG. 6 and described above.

At step 1002, method 1000 includes the SDN controller receiving a request to allocate an available channel in the optical network for new traffic or for traffic to be moved from a channel currently in use in the optical network. The request may specify a source address and a destination address for the new or moved traffic, and the SDN controller may determine the required distance, the channel bandwidth, the number of slices needed, and a suitable modulation type for satisfying the request, among other factors affecting the allocation. In various embodiments, the request may be made on behalf of an application executing in the optical network. For example, in some embodiments, the request may represent a request to provision one or more additional channels to handle an increase in on-demand traffic or a temporary surge in traffic. In some embodiments, the request may be made on behalf of an application that is moving traffic to different channels for load balancing, to better match the channel to certain performance requirements or for other reasons. In some embodiments, the request may be made as part of an attempt to begin defragmenting the optical spectrum.

At step 1004, the method includes the SDN controller attempting to identify a spectrum location of a given available channel in the optical network suitable for satisfying the request dependent on the stored test results. For example, the SDN controller may scan or analyze the test results to attempt to identify an available channel that includes a sufficient number of grid slices, has sufficient bandwidth and span, and supports a suitable modulation format to satisfy the request while meeting applicable performance requirements.

If, at step 1006, there are not sufficient grid slices available for satisfying the request, method 1000 may proceed to step 1008, where an error is returned. Otherwise, method 1000 continues at step 1010. If, at step 1010, no suitable location in the optical spectrum is identified that can satisfy the request, such as if no grid location that includes the required number of slices is available without moving some traffic, method 1000 proceeds to step 1012, where a defragmenting operation is initiated. In some embodiments, if enough slices are available in the spectrum for movement, they may be marked with a destination address for subsequent movement, such as during a next maintenance window. In some embodiments, the time and duration of the next maintenance window may be learned or predicted by a model-driven analysis service, such as model-driven analysis service 730 illustrated in FIG. 7, or by a machine-learning model, such as machine-learning model 914 illustrated in FIG. 9.

Once the defragmenting operation is complete, the method may return to step 1004, after which steps 1004 through 1010 may be repeated in a further attempt to identify a suitable location for satisfying the request.

If, at step 1010, a suitable location in the optical spectrum is identified that can satisfy the request, method 1000 proceeds to step 1014. At step 1014, method 1000 includes the SDN controller allocating the identified spectrum location to the given available channel for the new traffic or the traffic to be moved. In some embodiments, if two or more suitable locations are identified, the SDN controller may determine which of the options would have the least impact on existing traffic and may select the least-impacting option when allocating a spectrum location to satisfy the request.

At step 1016, the method includes the SDN controller selecting, for the given available channel dependent on the stored test results, a collection of transmission parameters suitable for satisfying the request. The collection of transmission parameters may specify two or more of a data rate, a data type, a modulation format, and a forward error correction mechanism. In some embodiments, the SDN controller may select a collection of transmission parameters from among a plurality of collections of transmission parameters suitable for satisfying the request, based on the required distance and other criteria.

At step 1018, method 1000 includes the SDN controller configuring a transponder of a network element in the optical network to transmit the new traffic or the traffic to be moved over the given available channel in accordance with the selected collection of transmission parameters.

Method 1000 may be repeated one or more times to allocate spectrum for channels in the software-defined optical network as additional requests are received on behalf of various applications.

In some embodiments, if a suitable grid location for a new channel or a channel to be moved cannot be found, the SDN controller may be configured to identify a channel that can be moved with minimal or no traffic impact. In some embodiments, standby channels may be moved to make room for a new channel or a channel being moved.

Figure 11:
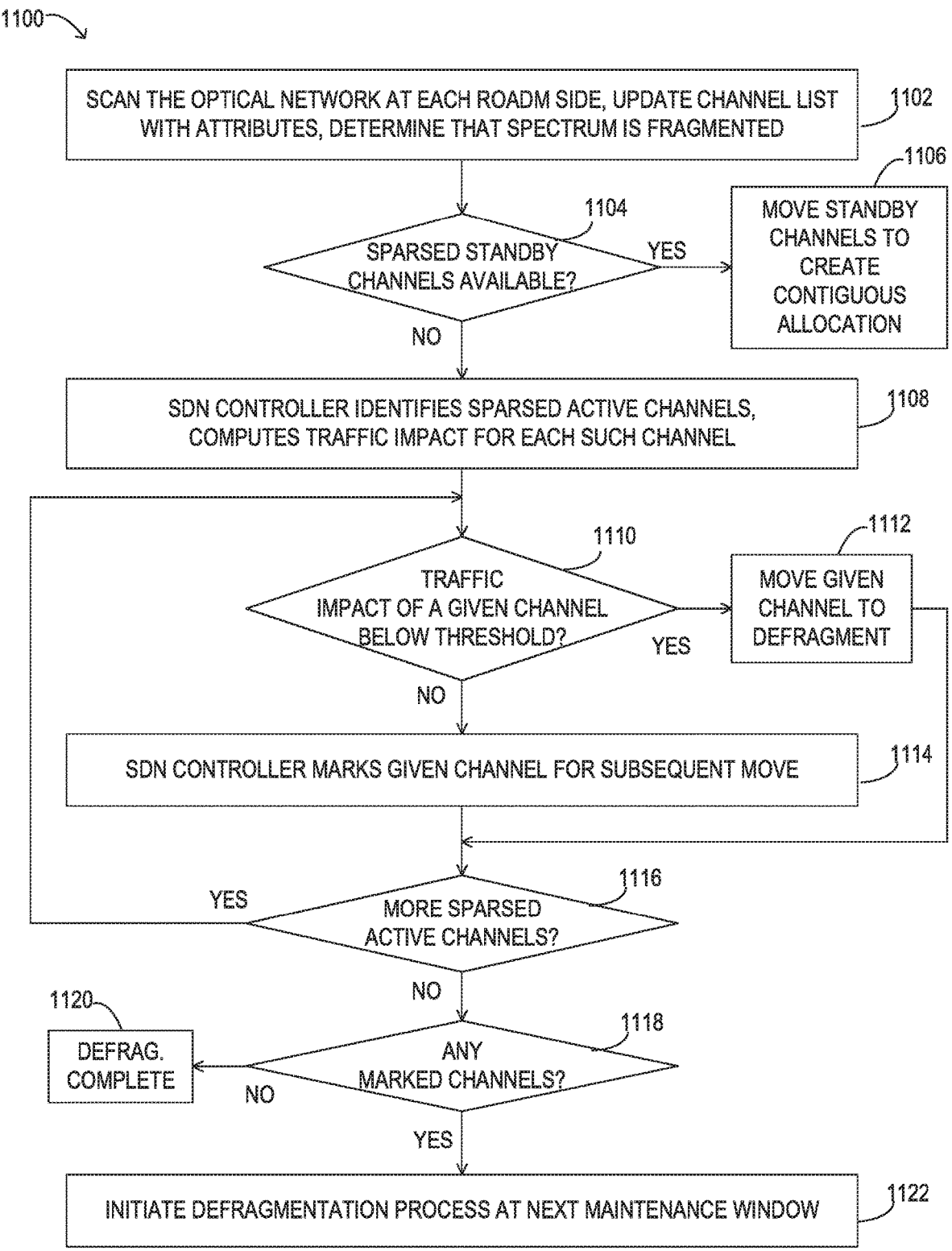
FIG. 11 is a flowchart of selected elements of an embodiment of a method for defragmenting spectrum in an optical network.

Referring now to FIG. 11, a block diagram of selected elements of an embodiment of method 1100 for defragmenting spectrum in an optical network, as described herein, is depicted in flowchart form. At least certain operations in method 700 may be performed using an SDN controller, such as SDN controller 240 illustrated in FIG. 2, SDN controller 700 illustrated in FIG. 7, or SDN controller 1300 illustrated in FIG. 13, dependent on physical and optical characteristics obtained, calculated, and stored by one or more transponders, such as coherent optical transmitter 210 and/or coherent optical receiver 230. In some embodiments, the software-defined optical network may be implemented on a fixed grid. In other embodiments, the software-defined optical network may be implemented on an adaptive flexible grid. It is noted that certain operations of method 1100 illustrated in FIG. 11 may be optional or may be performed in a different order, in different embodiments.

Method 1100 may begin at step 1102, by scanning an optical network at each ROADM side, updating the channel list with various characteristics of each channel as described herein, and determining that optical spectrum is fragmented.

If, at step 1104, it is determined that one or more sparsed standby channels is available, method 1100 proceeds to step 1106. At step 1106, the method includes moving the one or more standby channels to create a contiguous allocation.

If, at step 1104, it is determined that no sparsed standby channels are available, method 1100 proceeds to step 1108. At step 1108, the method includes the SDN controller identifying sparsed active channels and computing the traffic impact for each such channel in light of a potential move.

If, at step 1110, the traffic impact of a given channel is computed to be below a predefined threshold, method 1100 proceeds to step 1112. At step 1112, method 1100 includes moving the given channel to defragment the spectrum. In one example, if it is determined that there are active channels that could be moved with less than 50 ms of traffic impact, the method may include moving these channels to as part of the defragmentation of the spectrum. In some embodiments, the method may include calculating the traffic impact of the movement and notifying an operator or administrator of the optical network. If the operator or administrator accepts the traffic impact, the SDN controller may move the channels for defragmentation purposes or in order to launch a new channel in the created hole. If the operator or administrator does not accept the traffic impact, they may be provided with an option to make the move during the next maintenance window. In some embodiments, the time and duration of the next maintenance window may be learned or predicted by a model-driven analysis service, such as model-driven analysis service 730 illustrated in FIG. 7, or by a machine-learning model, such as machine-learning model 914 illustrated in FIG. 9. In some embodiments, the operator or administrator may choose to configure the optical network to use automatic channel switchovers or manual channel switchovers. If the optical network is configured for automatic channel switchovers, the SDN controller may perform the switchover during the next maintenance window automatically. Otherwise, the switchover will not be performed until and unless the operator or administrator manually initiates the switchover.

If, at step 1110, the traffic impact of a given channel is computed to be greater than or equal to the predefined threshold, any moves may be deferred until the next maintenance window. In this case, method 1100 proceeds to step 1114. At step 1114, the method includes the SDN controller marking the given channel for a subsequent move.

If, at step 1116, there are additional sparsed active channels, method 1100 returns to step 1110, after which steps 1110 through 1116 are repeated for each additional sparsed active channel. If, or once, there are no additional sparsed active channels, method 1100 proceeds to step 1118. If, at step 1118, there are no marked channels, the defragmentation may be complete based on the moves made so far, as shown at 1120.

If, at step 1118, there are one or more marked channels, method 1100 proceeds to step 1122. At step 1122, the method includes initiating the execution of a defragmentation process at next maintenance window. In some embodiments, the defragmentation process may include creating a doubly-linked list of occupied slices and a doubly-linked list of empty slices, then traversing the lists to the right and left of the largest block of consecutive slices, filling in empty spaces with smaller blocks of consecutive slices and increasing the size of the largest block until there are no additional empty spaces on either side of the largest block.

In some embodiments, standby channels may be supported in an optical network using a Y-cable-based switching mechanism. For example, in an optical network in which network elements include active transponders, standby transponders, and test transponders such as those described herein, a Y-cable-based switching mechanism may allow an SDN controller to use a test channel if and when a spare channel is needed for handling on-demand traffic. In various embodiments, the active and standby channels may reside on the same blade as two ports or may reside on respective ports on two different blades. The test transponder may be configurable to tune to any frequency and to operate using any of a variety of suitable collections of transmission parameters. In some embodiments, GCC bytes may be exchanged to perform inter-blade and/or intra-blade configuration and the traffic may be switched between transponders based upon a loss of signal, a surge in traffic, or another type of event that is observed or predicted in the optical system.

Figure 12:
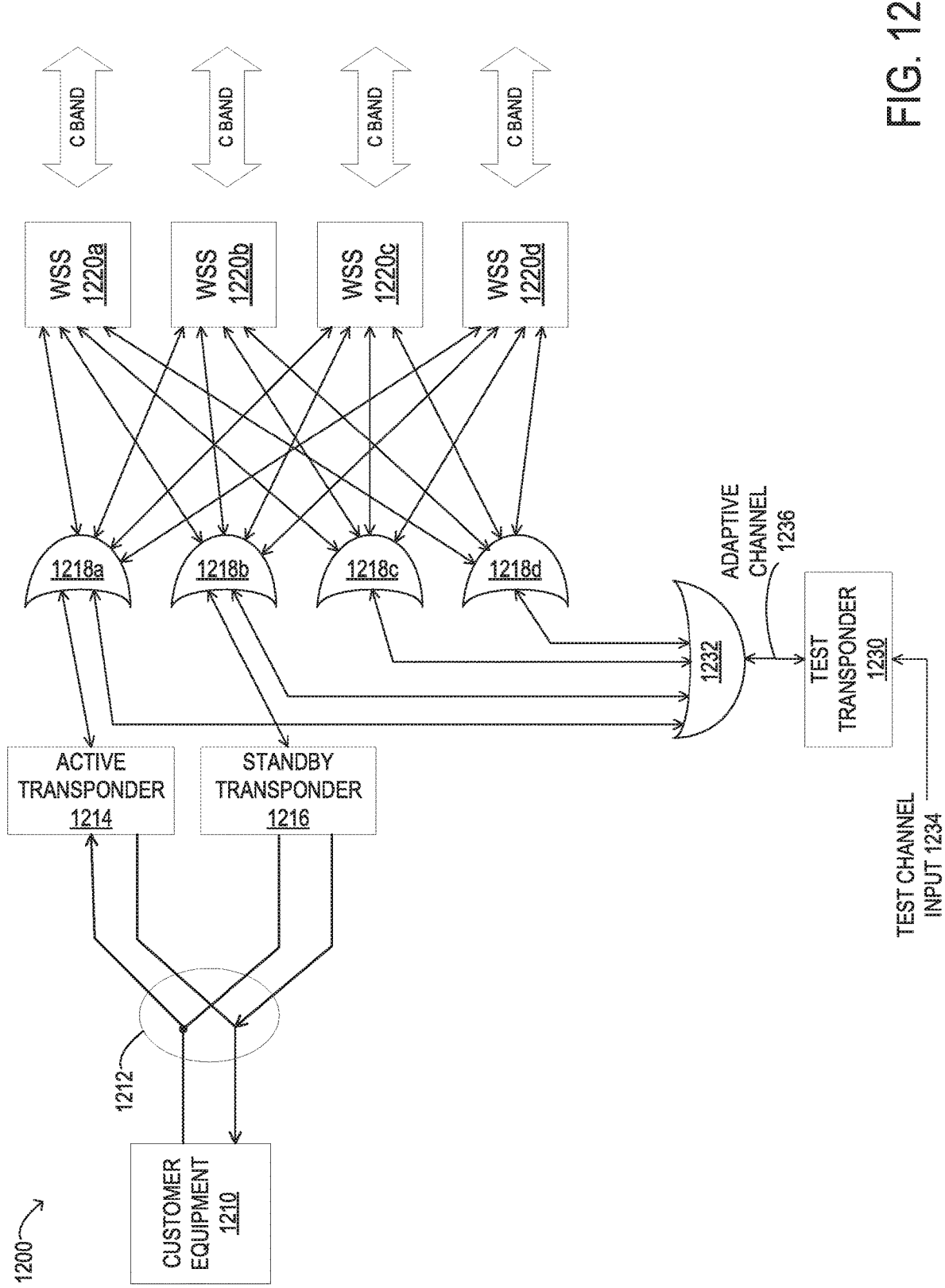
FIG. 12 illustrates selected elements of a switching mechanism for standby channel support in an SDN controller, in accordance with some embodiments.

FIG. 12 illustrates selected elements of a Y-cable-based switching mechanism 1200 for standby channel support in an SDN controller, in accordance with some embodiments. In the illustrated embodiment, optical traffic may be communicated between customer-provided equipment 1210 and various components of a network element in the optical network. In the illustrated embodiment, the network element includes an active transponder 1214 configured to transmit traffic for an active channel at a first central frequency, where the active channel is switched to a first one of multiple wavelength selective switches 1220, shown as 1220a, through a first data path switch 1218a. The network element also includes a standby transponder 1216 configured to transmit traffic for a standby channel at a second central frequency, where the standby channel is switched to one second of the multiple wavelength selective switches 1220, shown as 1220b, through a second data path switch 1218b. In the illustrated example, each of the wavelength selective switches 1220 may tune to selected portion of the C-band. Traffic received from the customer-provided equipment 1210 is routed to the active transponder 1214 and/or to the standby transformer 1216 through combiner/splitter 1212. Traffic generated by the active transponder 1214 and/or by the standby transformer 1216 is routed to the customer-provided equipment 1210 through combiner/splitter 1212.

In the illustrated embodiment, the network element also includes a test transponder 1230 coupled to the first data path switch 1218a, the second data path switch 1218b, and two additional data path switches, 1218c and 1218d, through a data path switch 1232. In at least some embodiments, the first data path switch 1218a, the second data path switch 1218b, and the data path switch 1232 are switchable to block the standby channel at the second data path switch 1218b and connect the test transponder 1230 to the second wavelength selective switch 1220b through the second data path switch. The input to the test transponder is shown as test channel input 1234. In some embodiments, and at certain times, the test transponder 1230 may be configured to perform a testing process to obtain data indicative of physical characteristic and calculate optical characteristics of various channels in a software-defined optical network. For example, the test transponder 1230 may be configured to perform method 400 illustrated in FIG. 4. In some embodiments, and at certain times, the test transponder 1230 may be used for on-demand traffic generation rather than for testing purposes, such as during a surge in traffic or when traffic is being moved from one channel to another in the optical network. Thus, at different times, adaptive channel 1236 may carry test traffic or on-demand traffic from test transponder 1230 to data path switch 1232 to be further switched to one of the four wavelength selective switches 1220 through one of the data path switches 1218.

As previously noted, software-defined networking represents an important step towards network virtualization and abstraction and may allow for a logical network entity to be instantiated automatically using software instructions, rather than manually from user input. An SDN controller, such as SDN controller 240 illustrated in FIG. 2 or SDN controller 700 illustrated in FIG. 7, may support requests or demands for network services by configuring an optical network (or a portion thereof) for a particular bandwidth, packet or flow prioritization, route selection, or latency. In some embodiments, an SDN controller, such as SDN controller 240 or SDN controller 700, may also be enabled to select an optimal number of channels for a given span between two network elements, or their respective transponders, in an optical network or for each of multiple pairs of network elements or transponders, resulting in a more efficient use of the entire spectral bandwidth.

Figure 13:
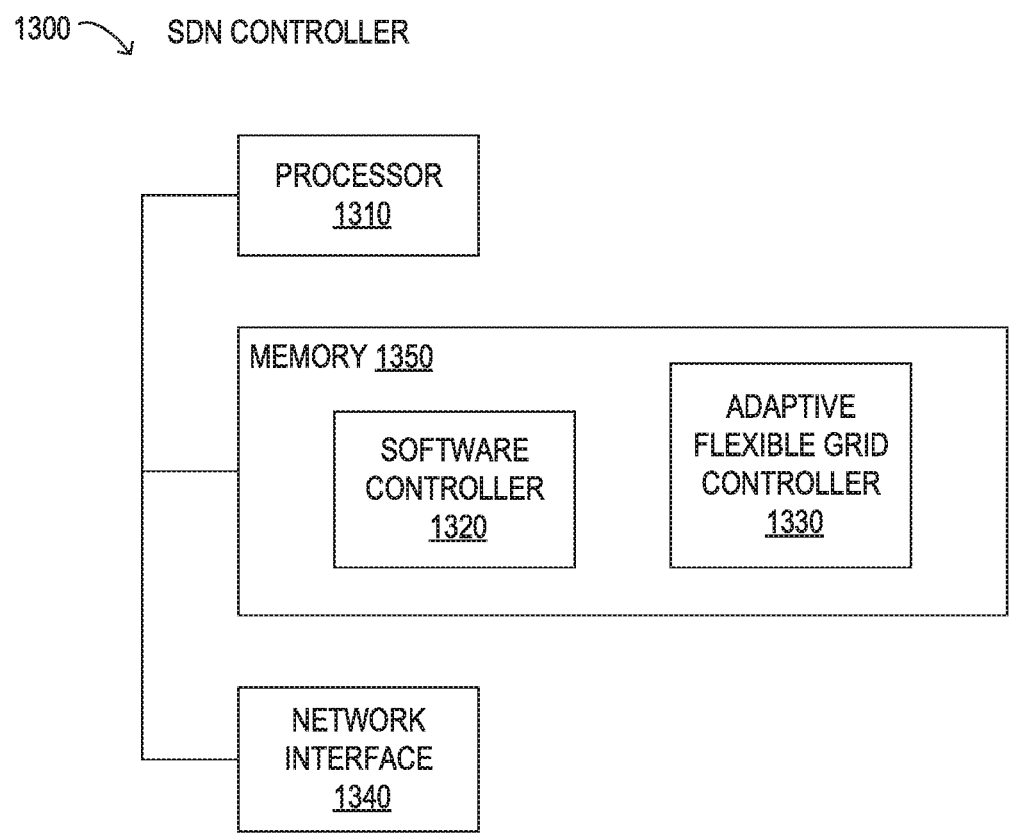
FIG. 13 is a block diagram of selected elements of an embodiment of a software-defined networking (SDN) controller.

Referring now to FIG. 13, a block diagram of selected elements of an embodiment of SDN controller 1300 is illustrated. SDN controller 1300 in FIG. 13 may be implemented to control and configure optical network 200 (see FIG. 2) and is a schematic diagram for descriptive purposes. SDN controller 1300 may represent an embodiment of SDN controller 240 or SDN controller 700 (see FIG. 7).

In FIG. 13, SDN controller 1300 is represented as a computer system including physical and logical components for controlling and configuring an optical network, as described herein, and may accordingly include processor 1310, memory 1350, and network interface 1340. Processor 1310 may represent one or more individual processing units and may execute program instructions, interpret data, process data stored by memory 1350 or SDN controller 1300. It is noted that SDN controller 1300 may be implemented differently in different embodiments. For example, in some embodiments, SDN controller 1300 may be implemented using a network node. In particular embodiments, memory 1350 may store executable instructions in the form of a software controller 1320 executing on processor 1310. For example, software controller 1320 may include functionality for network intelligence and control and may comprise applications (or software modules) that support the ability to establish network services, including applications or modules for discovery, routing, path computation, signaling, and other functions.

For example, a discovery module, such as device discovery module 716 illustrated in FIG. 7, may, along with a topology manager, such as topology manager 702 illustrated in FIG. 7, be responsible for discovery of neighbors and links between neighbors by sending discovery messages according to a discovery protocol, and receiving data about the optical signal transmission path. For example, in some embodiments, the discovery module may determine features, such as, but not limited to: fiber type, fiber length, number and type of components, data rate, modulation format of the data, input power of the optical signal, number of signal-carrying wavelengths (i.e., channels), channel spacing, traffic demand, and network topology, among others. In some embodiments, one or more of the physical or optical characteristics of a particular route between two network elements may be obtained by a test transponder at the direction of a test service, such as test service 712 illustrated in FIG. 7. In embodiments in which the optical network is used to provide low cost, short reach, high speed data transmission (e.g. inter-data center transmission), topology discovery might not be necessary. For example, the optical signal transmission path may be a point-to-point linear optical link (i.e., a single link or span).

In some embodiments, a path computation engine, such as path computation engine 704 illustrated in FIG. 7, may be configured to identify suitable routes between pairs of source network elements and destination network elements. Other applications (or software modules) of software controller 1320 may include a service activation element such as service activation element 706, a service monitoring element such as service monitoring element 708, an access control element such as access control element 714, a service restoration element such as service restoration element 718, a policy manager such as policy manager 720, a logging element such as logging element 722, a test service element such as test service element 712, and a machine learning application such as model-driven analysis service 730, as illustrated in FIG. 7. The applications or modules that make up software controller 1320 may work together to automatically establish services within the optical network in response to requests for service.

As shown, memory 1350 may also store adaptive flexible grid controller 1330, which may represent executable code stored in memory 1350 to implement configuring a flexible grid in an optical network, including selecting a minimum number of channels to allocate to traffic between two peers in the network, tuning of the modulation format for the traffic, and tuning of the forward error correction mechanism, including the number of forward error correction overhead bytes included in packets transmitted between the two peers. In some embodiments, adaptive flexible grid controller 1330 may include instructions executable to perform these functions in conjunction with, or based on predictions or recommendation made by, a machine learning application such as model-driven analysis service 730 or another element of software controller 1320.

In FIG. 13, memory 1350 may be communicatively coupled to processor 1310 and may comprise a system, device, or apparatus suitable to retain program instructions or data for a period of time (e.g., computer-readable media). Memory 1350 may include various types components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, or any suitable selection or array of volatile or non-volatile memory. Non-volatile memory refers to a memory that retains data after power is turned off. It is noted that memory 1350 may include different numbers of physical storage devices, in various embodiments. As shown in FIG. 13, memory 1350 may include software controller 1320 and adaptive flexible grid controller 1330, among other applications or programs available for execution.

Some non-limiting examples of external applications that may be used with SDN controller 1300 include orchestrators (NCX, Anuta Networks, Inc., Milpitas, Calif., USA; Exanova Service Intelligence, CENX, Ottawa, Canada), workflow managers (Salesforce Service Cloud, salesforce.com, Inc., San Francisco, Calif., USA; TrackVia, TrackVia, Inc., Denver, Colo., USA; Integrify, Integrify Inc., Chicago, Ill., USA); and analytics applications (Cloud Analytics Engine, Juniper Networks, Inc., Sunnyvale, Calif., USA; Nuage Networks Virtualized Services Directory (VSD), Nokia Solutions and Networks Oy, Espoo, Finland).

The C-band spectrum is very precious in short-haul metropolitan networks, as well as in other types of optical networks. Using the techniques described herein, an SDN controller may, based on information provided by a test transponder during testing, be able to maximize utilization of the optical spectrum in an optical network. More specifically, the systems and methods disclosed herein may be used to implement self-characterization of a software-defined optical network and to use the learned characterizations to make predictions and recommendations regarding utilization of bandwidth and other resources. A test transponder may, during testing, generate and transmit test traffic using various combinations of transmission parameters to obtain data indicative of physical characteristic of a route between two network elements. The test transponder may compute optical characteristics of the route based on the physical characteristics and the transmission parameters. The SDN controller may build and update a characterization database of test results which may be mined to create intelligence. Using this intelligence, the network may be adapted to handle requested, observed, or predicted changes in on-demand traffic and/or traffic surges. In some embodiments, the learned characterizations may be used to modify the configuration of one or more network elements, or transponders thereof, to reduce nonlinear impairments.

In some embodiments, the methods described herein may include defragmenting the optical spectrum using knowledge about active and standby channels in the network to minimize the impact of moving traffic between channels. In at least some embodiments, the disclosed methods may address the problem of creating space in the optical grid for freshly launched channels when the optical spectrum is fragmented. For example, these techniques may be applied to provide solutions for on-demand traffic requests from customers. In some embodiments, the disclosed methods may be used to defragment the optical spectrum with minimal or no impact on the existing traffic. In one example, using characteristics learned by the SDN controller, the impact of each potential channel movement may be computed and presented as an option to be taken during an upcoming planned maintenance window. In some embodiments, such actions may be taken automatically during the next maintenance window. While the disclosed techniques are described primarily in terms of optical networks operating in the C-band, they may also be applicable in optical networks that operate in the L-band, the S-band, or across multiple bands within the optical spectrum.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for self-characterization of a software-defined optical network, comprising:
  selecting, by a software-defined networking (SDN) controller for the optical network, a first network element on a first route in the optical network as a source network element, the first route representing a first available channel in the optical network;
  selecting, by the SDN controller, a second network element neighboring the first network element on the first route as a destination network element; and
  for each of a plurality of collections of transmission parameters for an optical transponder of the first network element:
    configuring, by the SDN controller, the optical transponder of the first network element to transmit traffic to the second network element over the first route between the first network element and the second network element in accordance with the collection of transmission parameters;
    activating, by the SDN controller, testing by the optical transponder of the first network element;
    transmitting, by the optical transponder of the first network element to the second network element over the first route in accordance with the collection of transmission parameters, test traffic generated by the optical transponder of the first network element;
    receiving, by the optical transponder of the first network element from the second network element responsive to the transmission of the test traffic, data indicative of one or more physical characteristics of the first route;

calculating, by the optical transponder of the first network element, one or more optical characteristics associated with the first route dependent on the collection of transmission parameters and the data indicative of the one or more physical characteristics of the first route; and storing, by the SDN controller, test results including the data indicative of the one or more physical characteristics of the first route and the one or more calculated optical characteristics in a characterization database in association with the collection of transmission parameters and an identifier of the first route.

2. The method of claim 1, wherein:

the collection of transmission parameters specifies two or more of a data rate, a data type, a modulation format, and a forward error correction mechanism; and selecting the first network element comprises determining that the optical transponder of the first network element includes circuitry to calculate the one or more optical characteristics associated with the first route dependent on the collection of transmission parameters and the data indicative of the one or more physical characteristics of the first route.

3. The method of claim 1, wherein:

the one or more physical characteristics comprise one or more of a distance between the first network element and the second network element, a fiber core diameter, a gain profile of a fiber, a dispersion profile of a fiber, a scattering profile of a fiber, or an absorption profile of a fiber; and the one or more optical characteristics comprise one or more of a spectral efficiency, an asymptotic power efficiency, an average symbol rate, an average energy per bit, a fiber attenuation, a stimulated Brillouin scattering, a stimulated Ramen scattering, and a Rayleigh scattering.

4. The method of claim 1, further comprising:

identifying, by the SDN controller, a second route between the first network element and the second network element; and for each of the plurality of collections of transmission parameters for the optical transponder of the first network element:

configuring, by the SDN controller, the optical transponder of the first network element to transmit traffic to the second network element over the second route between the first network element and the second network element in accordance with the collection of transmission parameters;

activating, by the SDN controller, additional testing by the optical transponder of the first network element;

transmitting, by the optical transponder of the first network element to the second network element over the second route in accordance with the collection of transmission parameters, test traffic generated by the optical transponder of the first network element;

receiving, by the optical transponder of the first network element from the second network element responsive to the transmission of the test traffic, data indicative of one or more physical characteristics of the second route;

calculating, by the optical transponder of the first network element, one or more optical characteristics associated with the second route dependent on the collection of transmission parameters and the data indicative of the one or more physical characteristics of the second route; and storing, by the SDN controller, test results including the data indicative of the one or more physical characteristics of the second route and the one or more calculated optical characteristics associated with the second route in the characterization database in association with the collection of transmission parameters and an identifier of the second route.

5. The method of claim 1, further comprising:

selecting, by the SDN controller, a third network element on a second route in the optical network as a source network element, the second route representing a second available channel in the optical network;

selecting, by the SDN controller, a fourth network element neighboring the third network element on the second route as a destination network element; and for each of a plurality of collections of transmission parameters for an optical transponder of the third network element:

configuring, by the SDN controller, the optical transponder of the third network element to transmit traffic to the fourth network element over the second route between the third network element and the fourth network element in accordance with the collection of transmission parameters for the optical transponder of the third network element;

activating, by the SDN controller, testing by the optical transponder of the third network element;

transmitting, by the optical transponder of the third network element to the fourth network element over the second route in accordance with the collection of transmission parameters for the optical transponder of the third network element, test traffic generated by the optical transponder of the third network element;

receiving, by the optical transponder of the third network element from the fourth network element responsive to the transmission of the test traffic, data indicative of one or more physical characteristics of the second route;

calculating, by the optical transponder of the third network element, one or more optical characteristics associated with the second route dependent on the collection of transmission parameters for the optical transponder of the third network element and the data indicative of the one or more physical characteristics of the second route; and storing, by the SDN controller, test results including the data indicative of the one or more physical characteristics of the second route and the one or more calculated optical characteristics associated with the second route in the characterization database in association with the collection of transmission parameters for the optical transponder of the third network element and an identifier of the second route.

6. The method of claim 1, further comprising:

receiving, by the SDN controller on behalf of an application executing on one or more network elements in the optical network, a request to allocate an available channel in the optical network for new traffic or for traffic to be moved from a channel in use in the optical network;

identifying, by the SDN controller, a spectrum location of a given available channel in the optical network suitable for satisfying the request dependent on the stored test results;
allocating, by the SDN controller, the identified spectrum location of the given available channel for the new traffic or the traffic to be moved;
selecting, by the SDN controller for the given available channel, one of the plurality of collections of transmission parameters suitable for satisfying the request dependent on the stored test results; and
configuring, by the SDN controller, a transponder of a network element in the optical network to transmit the new traffic or the traffic to be moved over the given available channel in accordance with the selected one of the plurality of collections of transmission parameters.

7. The method of claim 6, wherein:
the method further comprises providing, by the SDN controller, the test results to a machine learning model for analysis; and
identifying the spectrum location of the given available channel in the optical network suitable for satisfying the request is further dependent on the analysis.

8. The method of claim 1, further comprising providing, by the SDN controller, the test results to a machine learning model for analysis, the analysis comprising:
predicting future resource needs in the optical network; and
predicting whether or not the future resource needs can be met by the optical network.

9. A system for self-characterization of a software-defined optical network, comprising:
a plurality of network elements in a known grid topology, each comprising a respective optical transponder;
a software-defined networking (SDN) controller for the optical network, comprising a memory media and a processor having access to the memory media, wherein the memory media store instructions executable by the processor for:
selecting a first one of the plurality of network elements on a first route in the optical network as a source network element, the first route representing an available channel in the optical network;
selecting a second one of the plurality of network element neighboring the first network element on the first route as a destination network element; and
for each of a plurality of collections of transmission parameters for the optical transponder of the first network element:
configuring the optical transponder of the first network element to transmit traffic to the second network element over the first route between the first network element and the second network element in accordance with the collection of transmission parameters;
activating testing by the optical transponder of the first network element; and
storing test results in a characterization database in association with the collection of transmission parameters and an identifier of the first route;
wherein the optical transponder of the first network element comprises:
first circuitry to transmit, to the second network element over the first route in accordance with the collection of transmission parameters, test traffic generated by the optical transponder of the first network element;
second circuitry to receive, from the second network element, data indicative of one or more physical characteristics of the first route;
third circuitry to calculate one or more optical characteristics associated with the first route dependent on the collection of transmission parameters and the data indicative of the one or more physical characteristics of the first route; and
fourth circuitry to provide the test results, including the data indicative of the one or more physical characteristics of the first route and the one or more calculated optical characteristics, to the SDN controller.

10. The system of claim 9, wherein:
the one or more physical characteristics comprise one or more of a distance between the first network element and the second network element, a fiber core diameter, a gain profile of a fiber, a dispersion profile of a fiber, a scattering profile of a fiber, or an absorption profile of a fiber; and
the one or more optical characteristics comprise one or more of a spectral efficiency, an asymptotic power efficiency, an average symbol rate, an average energy per bit, a fiber attenuation, a stimulated Brillouin scattering, a stimulated Ramen scattering, and a Rayleigh scattering.

11. The system of claim 9, wherein:
the memory media further store instructions executable by the processor for:
identifying a second route between the first network element and the second network element; and
for each of the plurality of collections of transmission parameters for the optical transponder of the first network element:
configuring the optical transponder of the first network element to transmit traffic to the second network element over the second route between the first network element and the second network element in accordance with the collection of transmission parameters;
activating additional testing by the optical transponder of the first network element; and
storing results of the additional testing in the characterization database in association with the collection of transmission parameters and an identifier of the second route; and
the optical transponder of the first network element further comprises:
fifth circuitry to transmit, to the second network element over the second route in accordance with the collection of transmission parameters, test traffic generated by the optical transponder of the first network element;
sixth circuitry to receive, from the second network element, data indicative of one or more physical characteristics of the second route;
seventh circuitry to calculate one or more optical characteristics associated with the second route dependent on the collection of transmission parameters and the data indicative of the one or more physical characteristics of the second route; and
eighth circuitry to provide, to the SDN controller, the results of the additional testing, including the data indicative of the one or more physical characteristics of the second route and the one or more calculated optical characteristics associated with the second route.

12. The system of claim 9, wherein:
the memory media further store instructions executable by the processor for:
selecting, by the SDN controller, a third network element on a second route in the optical network as a source network element, the second route representing a second available channel in the optical network;
selecting, by the SDN controller, a fourth network element neighboring the third network element on the second route as a destination network element; and
for each of a plurality of collections of transmission parameters for an optical transponder of the third network element:
configuring the optical transponder of the third network element to transmit traffic to the fourth network element over the second route between the third network element and the fourth network element in accordance with the collection of transmission parameters for the optical transponder of the third network element;
activating additional testing by the optical transponder of the third network element; and
storing results of the additional testing including data indicative of one or more physical characteristics of the second route and one or more calculated optical characteristics associated with the second route in the characterization database in association with the collection of transmission parameters for the optical transponder of the third network element and an identifier of the second route; and
the optical transponder of the third network element further comprises:
fifth circuitry to transmit, to the fourth network element over the second route in accordance with the collection of transmission parameters for the optical transponder of the third network element, second test traffic generated by the optical transponder of the third network element;
sixth circuitry to receive, from the fourth network element responsive to the transmission of the second test traffic, data indicative of the one or more physical characteristics of the second route; and
seventh circuitry to calculate the one or more optical characteristics associated with the second route dependent on the collection of transmission parameters for the optical transponder of the third network element and the data indicative of the one or more physical characteristics of the second route.

13. The system of claim 9, wherein the memory media further store instructions executable by the processor for:
receiving, on behalf of an application executing on one or more network elements in the optical network, a request to allocate an available channel in the optical network for new traffic or for traffic to be moved from a channel in use in the optical network;
identifying a spectrum location of a given available channel in the optical network suitable for satisfying the request dependent on the stored test results;
allocating the identified spectrum location of the given available channel for the new traffic or the traffic to be moved;
selecting, for the given available channel, one of the plurality of collections of transmission parameters suitable for satisfying the request dependent on the stored test results; and
configuring a transponder of a network element in the optical network to transmit the new traffic or the traffic to be moved over the given available channel in accordance with the selected one of the plurality of collections of transmission parameters.

14. The system of claim 13, wherein:
the memory media further store instructions executable by the processor for providing the test results to a machine learning model for analysis; and
identifying the spectrum location of the given available channel in the optical network suitable for satisfying the request is further dependent on the analysis.

15. The system of claim 9, wherein the memory media further store instructions executable by the processor for providing the test results to a machine learning model for analysis, the analysis comprising:
predicting future resource needs in the optical network; and
predicting whether or not the future resource needs can be met by the optical network.

16. The system of claim 9, wherein the memory media further store instructions executable by the processor for creating a linked list of channels in the optical network in which each element in the linked list comprises data indicating attributes associated with a respective channel in the optical network, the attributes including one or more of an indication of whether the channel is occupied or available, a grid size, a center frequency, a span length, an indication of whether the channel is associated with an available standby channel, a supported data rate, a supported transmission protocol, a supported modulation format, an indication of whether the channel supports a fixed forward error correction mechanism or an adaptive forward error correction mechanism, a number of hops on the channel, a number of optical add/drop multiplexers, on the channel, and an impact on traffic when moving the channel.

17. The system of claim 9, wherein the first network element comprises:
an active transponder configured to transmit traffic for an active channel at a first central frequency, the active channel switched to a first wavelength selective switch through a first data path switch;
a standby transponder configured to transmit traffic for a standby channel at a second central frequency, the standby channel switched to a second wavelength selective switch through a second data path switch; and
a test transponder coupled to the first data path switch and the second data path switch through a third data path switch, the first, second, and third data path switches switchable to block the standby channel at the second data path switch and connect the test transponder to the second wavelength selective switch through the second data path switch.

18. An optical transponder of a first network element in a software-defined optical network, comprising:
first circuitry to receive, from a software-defined networking (SDN) controller, control information for configuring the optical transponder to transmit traffic to a second network element over a first route between the first network element and the second network element in accordance with a specified collection of transmission parameters of the optical transponder;

second circuitry to generate test traffic to be transmitted by the optical transmitter;

third circuitry to transmit, to the second network element over the first route in accordance with the specified collection of transmission parameters, the generated test traffic;

fourth circuitry to receive, from the second network element, data indicative of one or more physical characteristics of the first route;

fifth circuitry to calculate one or more optical characteristics associated with the first route dependent on the specified collection of transmission parameters and the data indicative of the one or more physical characteristics of the first route; and sixth circuitry to provide, to the SDN controller, first test results including the data indicative of the one or more physical characteristics of the first route and the one or more calculated optical characteristics associated with the first route.

19. The optical transponder of claim 18, wherein:

the one or more physical characteristics comprise one or more of a distance between the first network element and the second network element, a fiber core diameter, a gain profile of a fiber, a dispersion profile of a fiber, a scattering profile of a fiber, or an absorption profile of a fiber; and the one or more optical characteristics comprise one or more of a spectral efficiency, an asymptotic power efficiency, an average symbol rate, an average energy per bit, a fiber attenuation, a stimulated Brillouin scattering, a stimulated Ramen scattering, and a Rayleigh scattering.

20. The optical transponder of claim 18, further comprising:

seventh circuitry to receive, from the SDN controller, control information for configuring the optical transponder to transmit traffic to the second network element over a second route between the first network element and the second network element in accordance with a specified collection of transmission parameters of the optical transponder;

eighth circuitry to transmit, to the second network element over the second route in accordance with the collection of transmission parameters, second test traffic generated by the optical transponder of the first network element;

ninth circuitry to receive, from the second network element responsive to the transmission of the second test traffic, data indicative of one or more physical characteristics of the second route;

tenth circuitry to calculate one or more optical characteristics associated with the second route dependent on the collection of transmission parameters and the data indicative of the one or more physical characteristics of the second route; and eleventh circuitry to provide, to the SDN controller, second test results including the data indicative of the one or more physical characteristics of the second route and the one or more calculated optical characteristics associated with the second route.

* * * * *